United States Patent
Jung et al.

(10) Patent No.: US 9,806,654 B2
(45) Date of Patent: Oct. 31, 2017

(54) MOTOR DRIVING APPARATUS AND HOME APPLIANCE INCLUDING THE SAME

(71) Applicant: LG ELECTRONICS INC., Seoul (KR)

(72) Inventors: Hansu Jung, Seoul (KR); Hoyong Jang, Seoul (KR); Seokhee Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/238,894

(22) Filed: Aug. 17, 2016

(65) Prior Publication Data
US 2017/0054394 A1 Feb. 23, 2017

(30) Foreign Application Priority Data
Aug. 19, 2015 (KR) .......... 10-2015-0116914

(51) Int. Cl.
*H02P 21/00* (2016.01)
*H02P 21/18* (2016.01)
(Continued)

(52) U.S. Cl.
CPC ........... *H02P 21/18* (2016.02); *H02P 3/22* (2013.01); *H02P 6/20* (2013.01); *H02P 6/24* (2013.01); *H02P 27/06* (2013.01); *D06F 25/00* (2013.01)

(58) Field of Classification Search
CPC .... D06F 33/02; D06F 39/003; D06F 2202/12; D06F 2202/10; D06F 2204/06;
(Continued)

(56) References Cited

U.S. PATENT DOCUMENTS

| | | | |
|---|---|---|---|
| 7,145,316 B1 | 12/2006 | Galinski, III | |
| 8,281,438 B2 * | 10/2012 | Bae | D06F 33/02 68/12.04 |

(Continued)

FOREIGN PATENT DOCUMENTS

| | | |
|---|---|---|
| DE | 10 2009 001 195 | 9/2010 |
| EP | 1 596 491 | 11/2005 |

(Continued)

OTHER PUBLICATIONS

International Rectifier: "Application Note AN-978 RevD—HV Floating MOS-Gate Driver ICs," Internet Citation, dated Mar. 23, 2007, pp. 1-30 (XP002552371); [retrieved on Oct. 26, 2009]; Retrieved from the Internet: <URL: http:www.irf.com/technical—info/appnotes/an-978.pdf>.

(Continued)

*Primary Examiner* — Paul Ip
(74) *Attorney, Agent, or Firm* — KED & Associates, LLP

(57) ABSTRACT

Disclosed herein are a motor driving apparatus and a home appliance including the same. The motor driving apparatus includes a direct current (DC) link capacitor, an inverter, a DC link voltage detector, and a controller. The controller controls rheostatic braking to be performed in order to stop the motor, performs bootstrap operation of gate terminals of the upper arm switching elements of the inverter during a first period for starting the motor, and determines whether the motor stops during the first period based on the DC voltage detected by the DC link voltage detector or the output current detected by the output current detector. Accordingly, it is possible to conveniently determine whether the motor stops in the sensorless type motor driving apparatus.

20 Claims, 21 Drawing Sheets

(51) Int. Cl.
*H02P 3/22* (2006.01)
*H02P 6/20* (2016.01)
*H02P 6/24* (2006.01)
*H02P 27/06* (2006.01)
*D06F 25/00* (2006.01)

(58) Field of Classification Search
CPC ..... D06F 2058/2861; D06F 2058/2877; D06F 2202/085; D06F 2204/08; D06F 2204/086; D06F 25/00; D06F 35/003; D06F 35/006
USPC ............................ 318/400.02, 430, 432, 434
See application file for complete search history.

(56) References Cited

U.S. PATENT DOCUMENTS

| | | | | |
|---|---|---|---|---|
| 2006/0164093 | A1* | 7/2006 | Ooe | C02F 1/4606 324/432 |
| 2006/0284581 | A1 | 12/2006 | Mullin et al. | |
| 2007/0216758 | A1* | 9/2007 | Matsuura | H04N 1/00885 347/261 |
| 2010/0031451 | A1* | 2/2010 | Bae | D06F 33/02 8/159 |
| 2012/0005840 | A1* | 1/2012 | Jang | D06F 33/02 8/137 |
| 2012/0174631 | A1* | 7/2012 | Cho | D06F 37/304 68/12.23 |
| 2015/0047219 | A1* | 2/2015 | Lee | D06F 39/003 34/282 |
| 2015/0051738 | A1* | 2/2015 | Lee | D06F 39/003 700/275 |

FOREIGN PATENT DOCUMENTS

| | | |
|---|---|---|
| EP | 1 772 547 | 4/2007 |
| EP | 2 790 316 | 10/2014 |
| JP | 2004-040912 | 2/2004 |
| JP | 2009-264288 | 11/2009 |
| JP | 2013-085419 | 5/2013 |
| JP | 2013-190111 | 9/2013 |
| KR | 10-2002-0046715 | 6/2002 |
| WO | WO 03/105329 | 12/2003 |

OTHER PUBLICATIONS

International Search Report dated Dec. 26, 2016 issued in Application No. PCT/KR2016/009148.
European Search Report dated Feb. 3, 2017 issued in Application No. 16184510.2.
Korean Office Action dated Sep. 27, 2016 issued in Application No. 10-2015-0116914.

* cited by examiner

MOTOR DRIVING APPARATUS AND HOME APPLIANCE INCLUDING THE SAME

CROSS-REFERENCE TO RELATED APPLICATION

This application claims priority benefit under 35 U.S.C. §119 to Korean Patent Application No. 10-2015-0116914, filed on Aug. 19, 2015, whose entire disclosure is hereby incorporated herein by reference.

BACKGROUND

1. Field

The present disclosure relates to a motor driving apparatus and a home appliance including the same, and, more particularly, to a sensorless type motor driving apparatus capable of conveniently determining whether a motor stops and a home appliance including the same.

2. Background

A motor driving apparatus drives a motor including a rotor and a stator, around which a coil is wound. The motor driving apparatus may be divided into a sensor type motor driving apparatus using a sensor and a sensorless type motor driving apparatus. Recently, for manufacturing cost reduction, the sensorless type motor driving motor is widely used. Accordingly, for efficient motor driving, research into the sensorless type motor driving apparatus has been conducted.

BRIEF DESCRIPTION OF THE DRAWINGS

The embodiments will be described in detail with reference to the following drawings in which like reference numerals refer to like elements wherein.

DETAILED DESCRIPTION OF THE PREFERRED EMBODIMENTS

The motor driving apparatus described in this specification refers to a sensorless type motor driving apparatus for estimating the position of a rotor of a motor in a sensorless manner without a position sensor such as a Hall sensor for sensing the position of the rotor of the motor. Hereinafter, a sensorless type motor driving apparatus will be described. The suffixes "module" and "unit" in elements used in description below are given only in consideration of ease in preparation of the specification and do not have specific meanings or functions. Therefore, the suffixes "module" and "unit" may be used interchangeably. A motor driving apparatus according to an embodiment of the present disclosure may be referred to as a motor driver.

Figure 1:
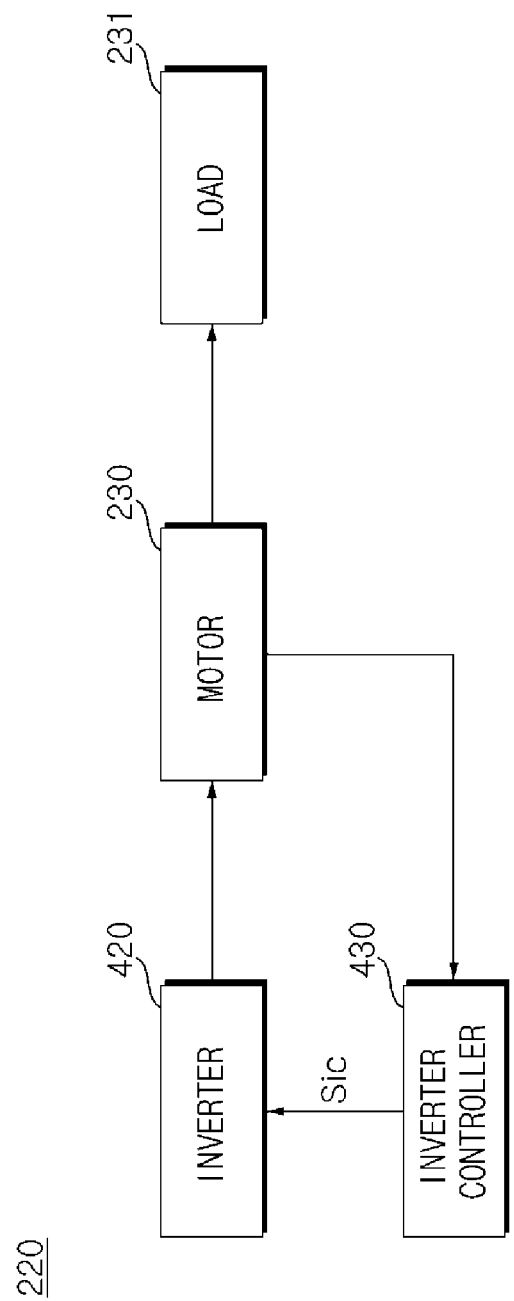
FIG. 1 is a block diagram showing an example of a motor driving apparatus according to an embodiment of the present disclosure.
Figure 2:
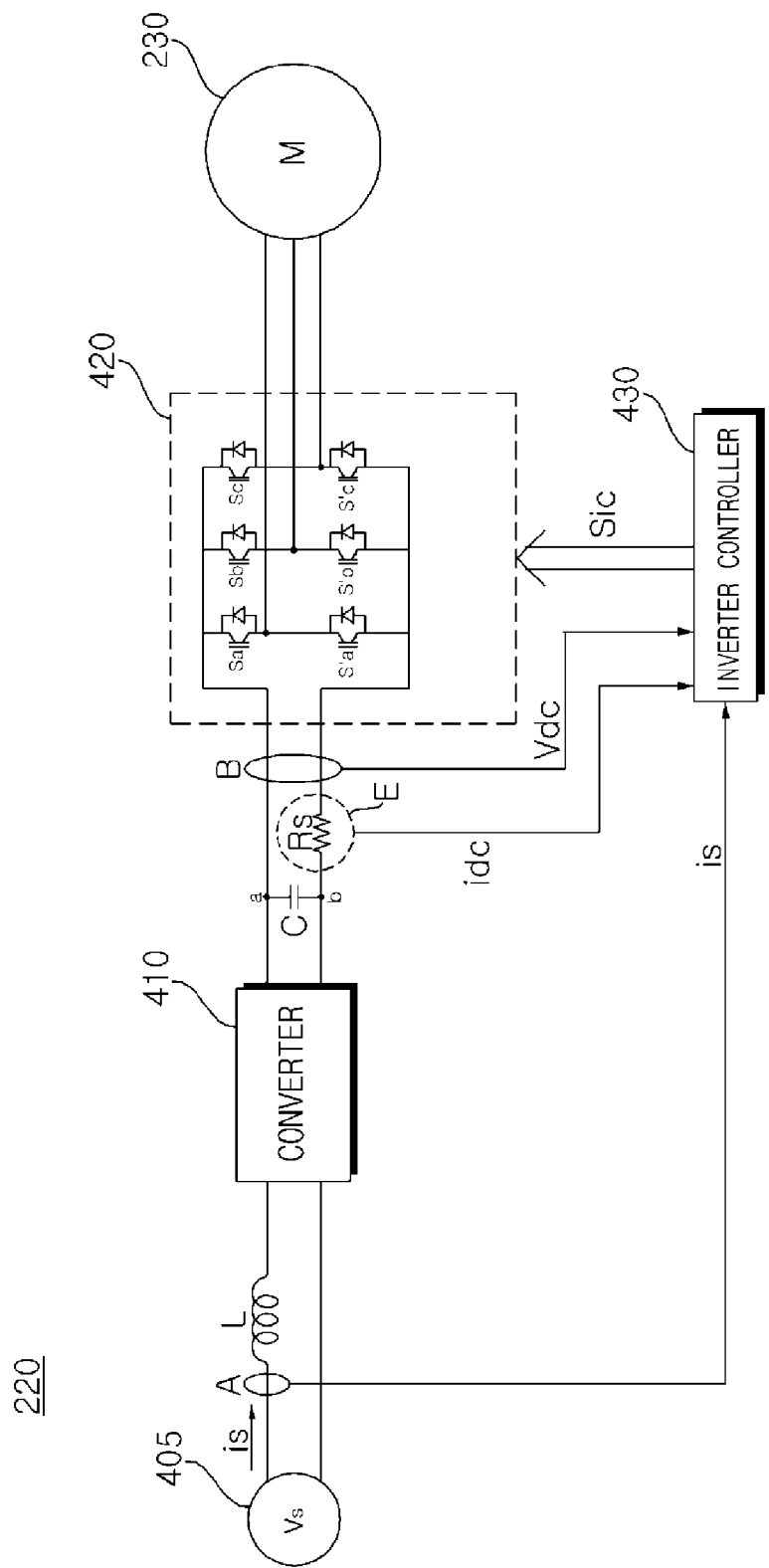
FIG. 2 is a circuit diagram showing an example of the motor driving apparatus of FIG. 1.

FIG. 1 is a block diagram showing an example of a motor driving apparatus according to an embodiment of the present disclosure, and FIG. 2 is a circuit diagram showing an example of the motor driving apparatus of FIG. 1. Referring to the figure, the motor driving apparatus 220 according to the embodiment of the present disclosure drives a motor in a sensorless manner and may include an inverter 420 and an inverter controller 430. The motor driving apparatus 220 according to the embodiment of the present disclosure may include a converter 410, a dc link voltage detector B, a smoothing capacitor C and an output current detector E. In addition, the motor driving apparatus 220 may further include an input current detector A, a reactor L, etc.

The inverter controller 430 of the motor driving apparatus 220 according to the embodiment of the present disclosure may control rheostatic braking to be performed in order to stop a motor 230, perform bootstrap operation of gate terminals of upper arm switching elements of the inverter 420 during a first period for starting the motor 230 after rheostatic braking, and determine whether the motor 230 stops during the first period based on a dc link voltage detected by the dc link voltage detector B or output current detected by the output current detector E. Therefore, the sensorless type motor driving apparatus can conveniently determine whether the motor stops.

In particular, since the inverter controller 430 determines whether the motor 230 stops during the first period in which the bootstrap operation is performed, a time for determining whether the motor stops is not separately required. The inverter controller 430 may determine that the motor 230 rotates when change in the dc link voltage detected by the dc link voltage detector B is equal to or greater than a first predetermined value or when a peak value of the dc link voltage detected by the dc link voltage detector B is equal to or greater than a first level, and controls resumption of rheostatic braking in order to stop the motor 230.

The inverter controller 430 may determine that the motor 230 stops when change in the dc link voltage detected by the dc link voltage detector B is less than the first predetermined value or when the peak value of the dc link voltage detected by the dc link voltage detector B is less than the first level, and controls alignment of the motor 230 after the first period. The inverter controller 430 may determine that the motor 230 rotates when change in output current detected by the output current detector E is equal to or greater than a second predetermined value or when a peak value of the output current detected by the output current detector E is equal to or greater than a second level, and control resumption of rheostatic braking again in order to stop the motor 230.

The inverter controller 430 may determine that the motor 230 stops when change in output current detected by the output current detector E is less than the second predetermined value or when the peak value of the output current detected by the output current detector E is less than the second level, and control alignment of the motor 230 after the first period. The inverter controller 430 of the motor driving apparatus 220 according to another embodiment of the present disclosure may determine that the motor 230 rotates when change in the dc link voltage detected by the dc link voltage detector B is equal to or greater than a first predetermined value or when a peak value of the dc link voltage detected by the dc link voltage detector B is equal to or greater than a first level, and control stopping of the motor 230, upon restarting the motor 230 after stopping. Therefore, the sensorless type motor driving apparatus can conveniently determine whether the motor stops.

Hereinafter, operation of the units of the motor driving apparatus 220 of FIGS. 1 and 2 will be described. The reactor L is disposed between a commercial AC power source 405 having a voltage Vs and the converter 410 to perform power factor correction and boosting operation. In addition, the reactor L may perform a function for limiting harmonic current by high-speed switching.

The input current detector A may detect input current is from the commercial AC power source 405. To this end, a current transformer (CT), a shunt resistor, etc. may be used as the input current detector A. The detected input current is may be input to the inverter controller 430 as a pulse type discrete signal.

The converter 410 may convert the AC voltage of the commercial AC power source 405 passing through the reactor L into a DC voltage. Although a single-phase AC power source is shown as the commercial AC power source 405 in the figure, a three-phase AC power source may be used. The internal structure of the converter 410 may be changed according to type of the commercial AC power source 405.

The converter 410 may include a diode without a switching element and perform rectification operation without performing separate switching operation. For example, in a single-phase AC power source, four diodes may be used in the form of a bridge. In a three-phase AC power source, six diodes may be used in the form of a bridge. As the converter 410, a half-bridge converter, in which two switching elements and four diodes are connected, may be used. In a three-phase AC power source, six switching elements and six diodes may be used. When the converter 410 includes a switching element, it is possible to perform boosting operation, power factor improvement and DC voltage conversion by switching operation of the switching element.

The smoothing capacitor C smooths an input voltage and stores the smoothed voltage. Although one smoothing capacitor C is shown in the figure, a plurality of smoothing capacitors may be included in order to ensure stability.

Although the smoothing capacitor is connected to the output terminal of the converter 410, the DC voltage may be directly input to the smoothing capacitor without being limited thereto. For example, the DC voltage from a solar cell may be input to the smoothing capacitor C directly or after DC/DC conversion. Hereinafter, parts shown in the figure will be focused upon. Since the DC voltage is stored in the smoothing capacitor C, both ends of the smoothing capacitor may be referred to as dc ends or dc-link ends.

The dc link voltage detector B may detect a dc link voltage Vdc between the both ends of the smoothing capacitor C. To this end, the dc link voltage detector B may include a resistor, an amplifier, etc. The detected dc link voltage Vdc may be input to the inverter controller 430 as a pulse type discrete signal.

The inverter 420 may include a plurality of inverter switching elements and convert the dc voltage Vdc smoothed by on/off operation of the switching elements into three-phase AC voltages va, vb and vc having a predetermined frequency and output the three-phase AC voltages to the three-phase synchronous motor 230.

The inverter 420 includes upper arm switching elements Sa, Sb, and Sc and lower arm switching elements S'a, S'b, and S'c, each pair of an upper arm switching element and a lower arm switching element being connected in series and three pairs of upper and lower arm switching elements Sa and S'a, Sb and S'b, and Sc and S'c being connected in parallel. Diodes may be connected in anti-parallel to the respective switching elements Sa, S'a, Sb, S'b, Sc, and S'c.

The switching elements of the inverter 420 perform on/off operation based on an inverter switching control signal Sic from the inverter controller 430. Thus, the three-phase AC voltages having the predetermined frequency are output to the three-phase synchronous motor 230.

The inverter controller 430 may control switching operation of the inverter 420 in a sensorless manner. To this end, the inverter controller 430 may receive output current idc detected by the output current detector E.

The inverter controller 430 outputs the inverter switching control signal Sic to the inverter 420 in order to control switching operation of the inverter 420. The inverter switching control signal Sic is generated and output based on the output current idc detected by the output current detector E, as a pulse width modulation (MWM) switching control signal. Detailed operation for outputting the inverter switching control signal Sic from the inverter controller 430 will be described with reference to FIG. 3.

The output current detector E may detect output current idc flowing in the three-phase motor 230. The output current detector E may be disposed between the dc link capacitor C and the inverter 420 to detect current flowing in the motor. In particular, the output current detector E may include one shunt resistor Rs.

The output current detector E may detect phase current which is output current idc flowing in the motor 230 in a time divisional manner upon turning the lower arm switching elements of the inverter 420 on, using one shunt resistor Rs. The detected output current idc may be applied to the inverter controller 430 as a pulse type discrete signal and the inverter switching control signal Sic may be generated based on the detected output current idc. Hereinafter, assume that the detected output current idc are made up of three-phase output currents ia, ib, ic.

The three-phase motor 230 includes a stator and a rotor. The AC voltage of each phase, which has the predetermined frequency, is applied to the coil of the stator of each phase a, b or c to rotate the rotor.

The motor 230 may include a surface-mounted permanent-magnet synchronous motor (SMPMSM), an interior permanent magnet synchronous motor (IMPSM) and a synchronous reluctance motor (SYNRM), for example. The SMPMSM and the IPMSM are permanent magnet synchronous motors (PMSMs) using a permanent magnet and the Synrm does not include a permanent magnet.

Figure 3:
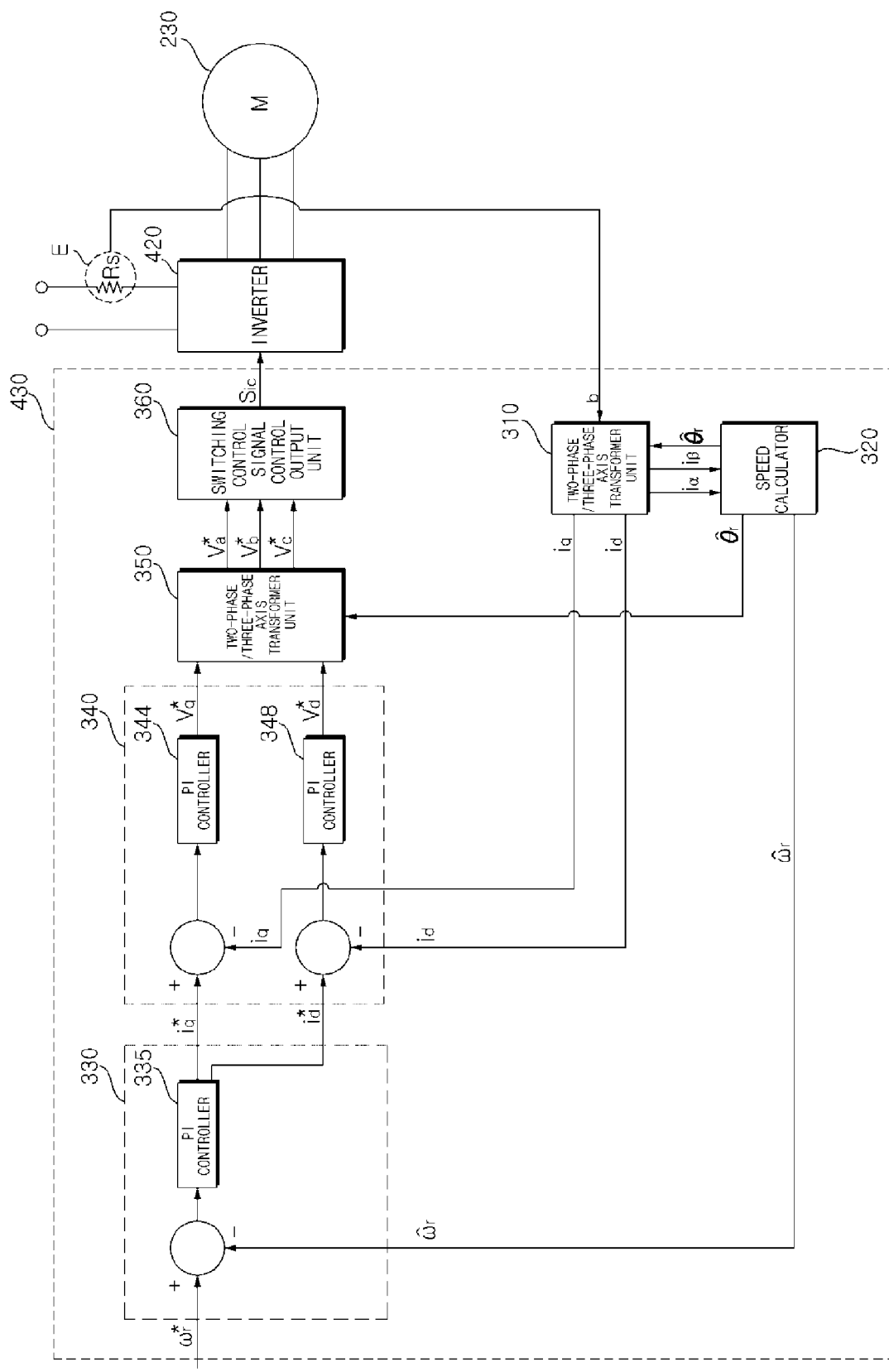
FIG. 3 is a block diagram showing an inverter controller of FIG. 2.

FIG. 3 is a block diagram showing the inverter controller of FIG. 2. Referring to FIG. 3, the inverter controller 430 may include an axis transformation unit 310, a speed calculator 320, a current command generator 330, a voltage command generator 340, an axis transformation unit 350 and a switching control signal output unit 360.

The axis transformation unit 310 may extract three-phase currents ia, ib, ic from the output current idc detected by the output current detector E and transform the extracted phase currents ia, ib, ic into two-phase currents iα and iβ of a stationary coordinate system. The axis transformation unit 310 may transform two-phase currents iα and iβ of the stationary coordinate system into two-phase currents id and iq of a rotating coordinate system.

The speed calculator 320 may estimate a position $\hat{\theta}_r$ based on the output current idc detected by the output current detector E, differentiate the estimated position and calculate a speed $\hat{\omega}_r$.

The current command generator 330 generates a current command value i*q based on the calculated speed $\hat{\omega}_r$ and a speed command value ω*r. For example, the current command generator 330 may perform PI control in a PI controller 335 based on a difference between the calculated speed $\hat{\omega}_r$ and the speed command value ω*r and generate the current command value i*q. Although a q-axis current command value i*q is shown as the current command value in the figure, a d-axis current command value i*d may also be generated unlike the figure. The value of the d-axis current command value i*d may be set to 0. The current command generator 330 may further include a limiter (not shown) for limiting the level of the current command value i*q not to exceed an allowable range.

Next, the voltage command generator 340 generates d-axis and q-axis voltage command values v*d and v*q based on the d-axis and q-axis currents id and iq transformed into the two-phase rotating coordinate system by the axis transformation unit and the current command values i*d and i*q from the current command generator 330. For example, the voltage command generator 340 may perform PI control in the PI controller 344 based on a difference between the q-axis current iq and the q-axis current command i*q and generate a q-axis voltage command value v*q. In addition, the voltage command generator 340 may perform PI control in the PI controller 348 based on a difference between the d-axis current id and the d-axis current command i*d and generate a d-axis voltage command value v*d. The voltage command generator 340 may further include a limiter (not shown) for limiting the level of the d-axis and q-axis voltage command values v*d and v*q not to exceed an allowable range. The generated d-axis and q-axis voltage command values v*d and v*q are input to the axis transformation unit 350.

The axis transformation unit 350 receives the position $\hat{\theta}_r$ calculated by the speed calculator 320 and the d-axis and q-axis voltage command values v*d and v*q and performs axis transformation. First, the axis transformation unit 350 transforms a two-phase rotating coordinate system into a two-phase stationary coordinate system. At this time, the position $\hat{\theta}_r$ calculated by the speed calculator 320 may be used.

The axis transformation unit 350 transforms a two-phase stationary coordinate system into a three-phase stationary coordinate system. Through such transformation, the axis transformation unit 1050 outputs three-phase output voltage command values v*a, v*b and v*c.

The switching control signal output unit 360 generates and outputs an inverter switching control signal Sic according to a pulse width modulation (PWM) method based on the three-phase output voltage command values v*a, v*b and v*c. The output inverter switching control signal Sic may be converted into a gate drive signal by a gate driver (not shown) and input to the gate of each switching element of the inverter 420. Accordingly, the switching elements Sa, S'a, Sb, S'b, Sc and S'c of the inverter 420 may perform switching operation.

The switching control signal output unit 360 may output a switching control signal for turning all the upper arm switching elements Sa, Sb and Sc of the inverter 420 on or turning all the lower arm switching elements S'a, S'b and S'c of the inverter 420 off, in order to perform rheostatic braking when the motor 230 stops. During a first period for starting the motor 230, the switching control signal output unit 360 may output the switching control signal for turning all the upper arm switching elements Sa, Sb and Sc and lower arm switching elements S'a, S'b and S'c of the inverter 420 off and then turning the upper arm switching elements Sa, Sb and Sc of the inverter 420 off and turning the lower arm switching elements S'a, S'b and S'c on after a predetermined time, in order to perform bootstrap operation of the gate terminals of the upper arm switching elements of the inverter 420.

The current command generator 330 may generate a current command value for aligning the rotor of the motor in a motor rotor alignment period, after bootstrap operation. The switching control signal output unit 360 may output a switching control signal for turning any one of the upper arm switching elements Sa, Sb and Sc of the inverter 420 on and turning two-phase switching elements of the lower arm switching elements S'a, S'b and S'c on.

The current command generator 330 may output a switching control signal for continuously increasing or changing the speed of the motor in a motor acceleration period or a motor normal-operation period, after the alignment period. The speed of the motor 230 increases in the motor acceleration period or varies in the motor normal-operation period.

Figure 4:
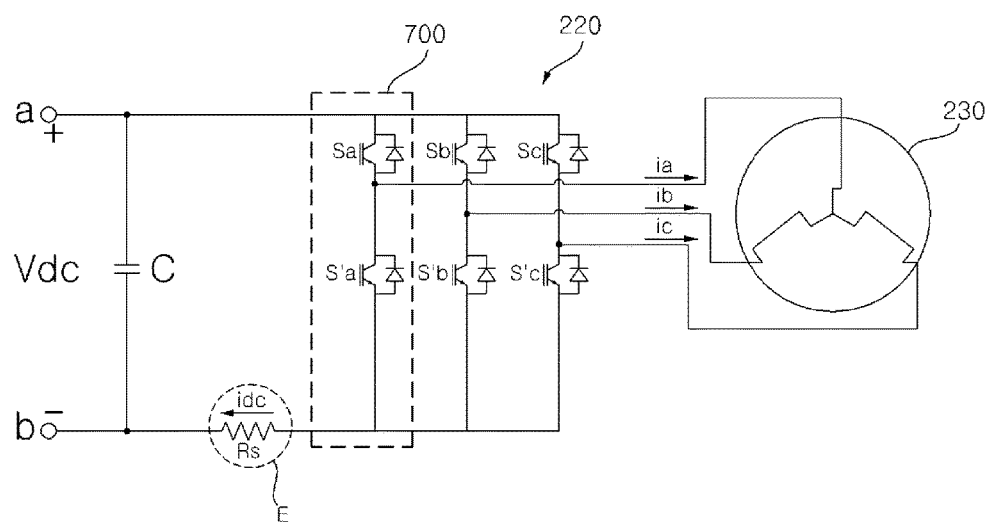
FIG. 4 is an expanded circuit diagram of the inverter of FIG. 2.

FIG. 4 is an expanded circuit diagram of the inverter of FIG. 2. Referring to the figure, the inverter 420 may include the upper arm switching elements Sa, Sb and Sc and lower arm switching elements S'a, S'b and S'c connected to each other in series between the dc ends (nodes a and b), in order to output the three-phase currents ia, ib, and ic to the motor 230. That is, each of the upper arm switching elements Sa, Sb and Sc and each of the lower arm switching elements S'a, S'b and S'c form a pair and three pairs of upper and lower arm switching elements Sa and S'a, Sb and S'b, and Sc and S'c are connected in parallel.

For detection of the output current idc flowing in the motor 230, the output current detector E may be disposed between the dc link capacitor C and the inverter 420. In particular, the output current detector E may include one shunt resistor Rs.

Each of the switching elements of the inverter 420 may include an insulated gate bipolar transistor (IGBT), for example. In order to drive the switching elements Sa, Sb, Sc, S'a, S'b and S'c, a gate drive signal is input to a gate terminal. Such a gate drive signal may be supplied by a gate driver. A gate capacitor is used to supply an operating voltage of the gate driver. The gate driver operates after the gate capacitor is charged with the gate drive voltage to perform switching operation of the switching elements Sa, Sb, Sc, S'a, S'b and S'c. Charging the gate capacitor with the gate drive voltage will be described below with reference to FIGS. 7A to 7C.

Figure 5A:
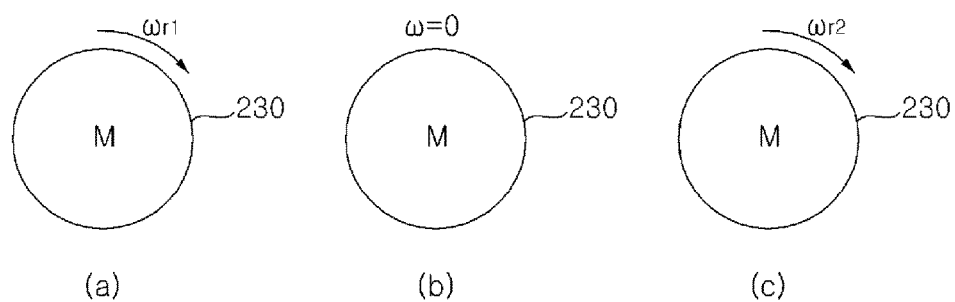
FIGS. 5A to 5E are views referenced to explain motor restarting after motor stoppage.

FIGS. 5A to 5E are views referenced to explain motor restarting after motor stoppage. Portion (a) of FIG. 5A shows a state in which the motor 230 rotates at a predetermined speed ωr1 in a clockwise direction, portion (b) of FIG. 5A shows a state in which the motor 230 stops, and portion (c) of FIG. 5A shows a state in which the motor 230 restarts and rotates at a predetermined speed ωr2 in a clockwise direction.

Figure 5B:
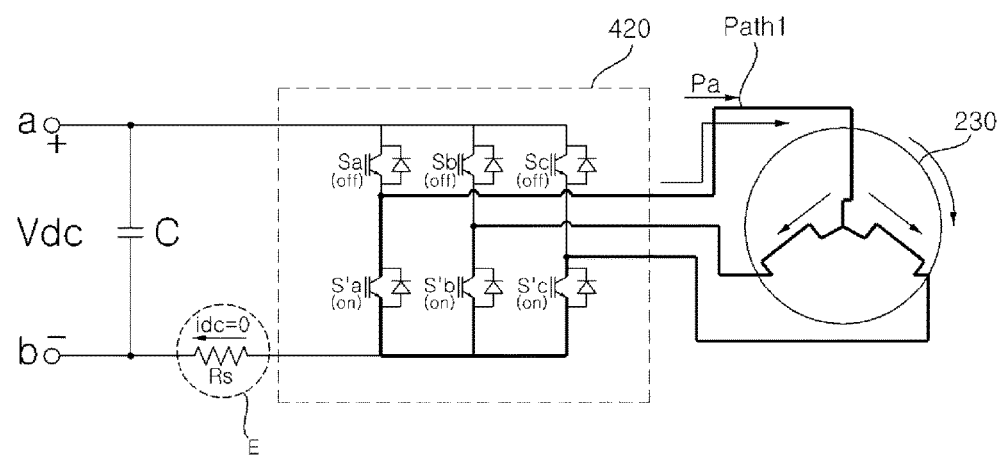
Figure 5C:
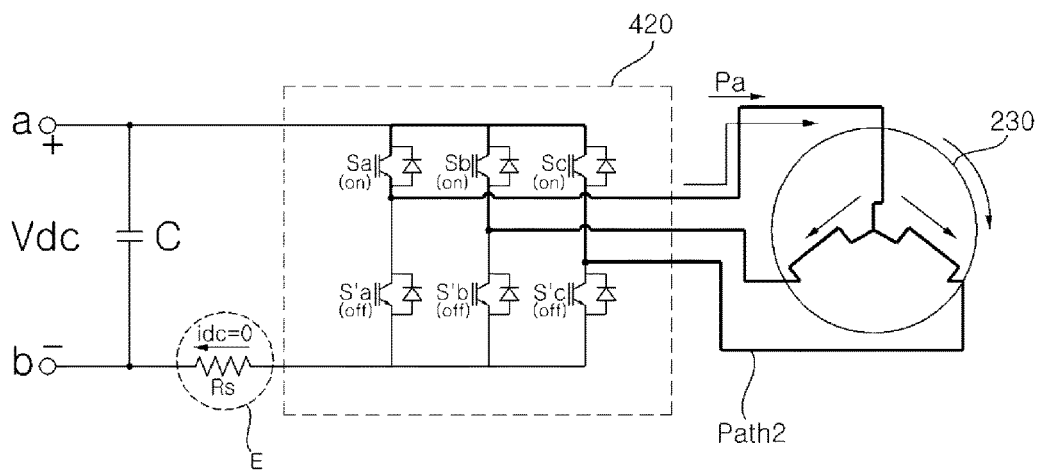

FIGS. 5B to 5C are diagrams showing a method of stopping the motor 230. First, FIG. 5B shows a state in which the upper arm switching elements Sa, Sb and Sc of the inverter 420 are all turned off and the lower arm switching elements S'a, S'b and S'c are all turned on, in order to stop the motor 230. That is, the inverter 420 operates according to the switching control signal Sic of a zero vector, power Pa is consumed by flow of current, and the motor 230 stops after a predetermined time. Such a method may be referred to as rheostatic braking.

At this time, the lower arm switching elements S'a, S'b and S'c of the inverter 420 and the motor 230 form a current path path1 and thus the output current detector E disposed between the dc link capacitor C and the inverter 420 cannot detect output current. In addition, the dc link voltage detected by the dc link voltage detector B is not changed.

Next, FIG. 5C shows a state in which the upper arm switching elements Sa, Sb and Sc of the inverter 420 are all turned on and the lower arm switching elements S'a, S'b and S'c are all turned off, in order to stop the motor 230. That is, the inverter 420 operates according to the switching control signal Sic of the zero vector, power Pa is consumed by flow of current, and the motor 230 stops after a predetermined time.

At this time, the upper arm switching elements Sa, Sb and Sc of the inverter 420 and the motor 230 form a current path path2 and thus the output current detector E disposed between the dc link capacitor C and the inverter 420 cannot detect output current. In addition, the dc link voltage detected by the dc link voltage detector B is not changed.

Figure 5D:
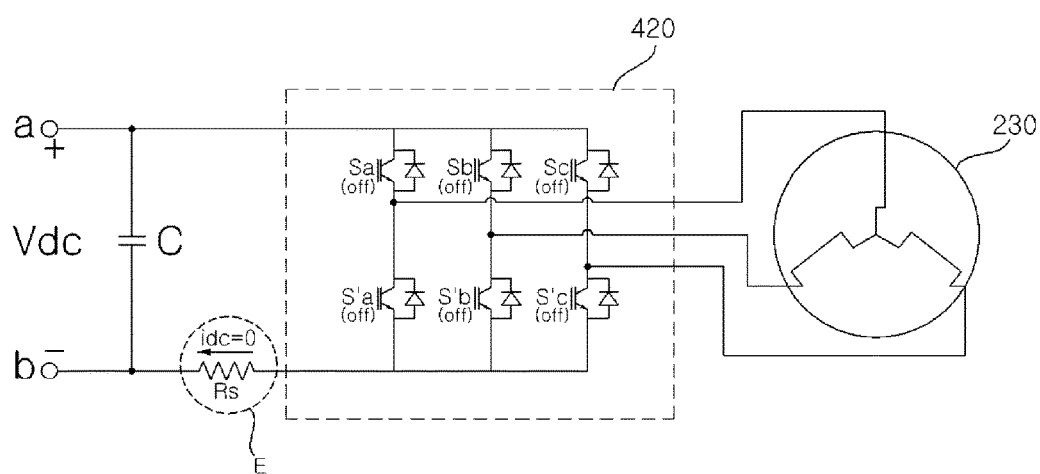
Figure 5E:
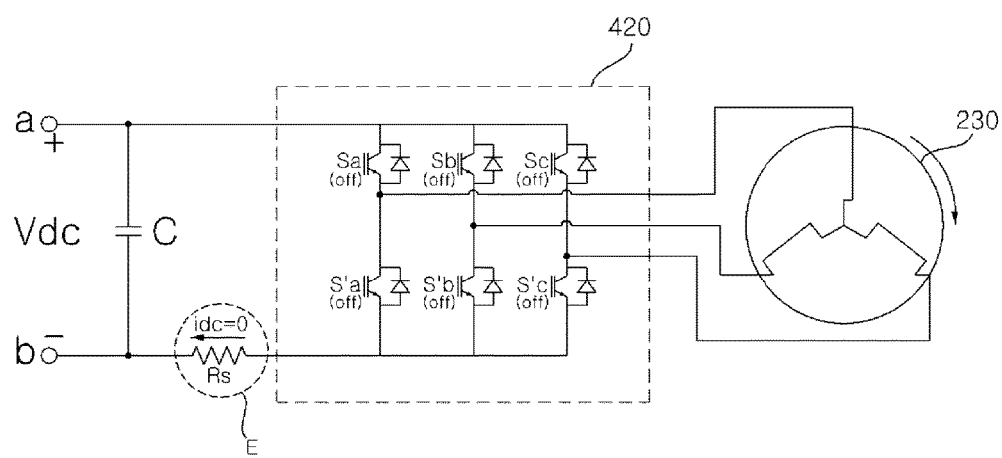

FIG. 5D shows a state in which the motor 230 actually stops by rheostatic braking, and FIG. 5E shows a state in which the motor 230 actually rotates despite rheostatic braking.

As a result, as shown in FIGS. 5B to 5C, it becomes difficult to determine whether the motor 230 completely stops, upon rheostatic braking. Since the output current detector E is disposed between the dc link capacitor C and the inverter 420, it becomes difficult to determine whether the motor 230 completely stops, upon rheostatic braking. In order to solve such a problem, there is a method of restarting the motor when a sufficient time has elapsed after rheostatic braking. However, this method requires a considerable time and cannot immediately cope with restarting.

In the present disclosure, upon restarting the motor after stopping, it is possible to determine whether the motor 230 stops, using a rate of increase of the dc link voltage or a peak value of the dc link voltage upon restarting and, more particularly, during a bootstrap charging period. According to this method, a time for restarting the motor after stopping the motor is not required and a determination as to whether the motor 230 stops is conveniently made. This will be described with reference to FIG. 6 or subsequent figures thereof.

Figure 6:
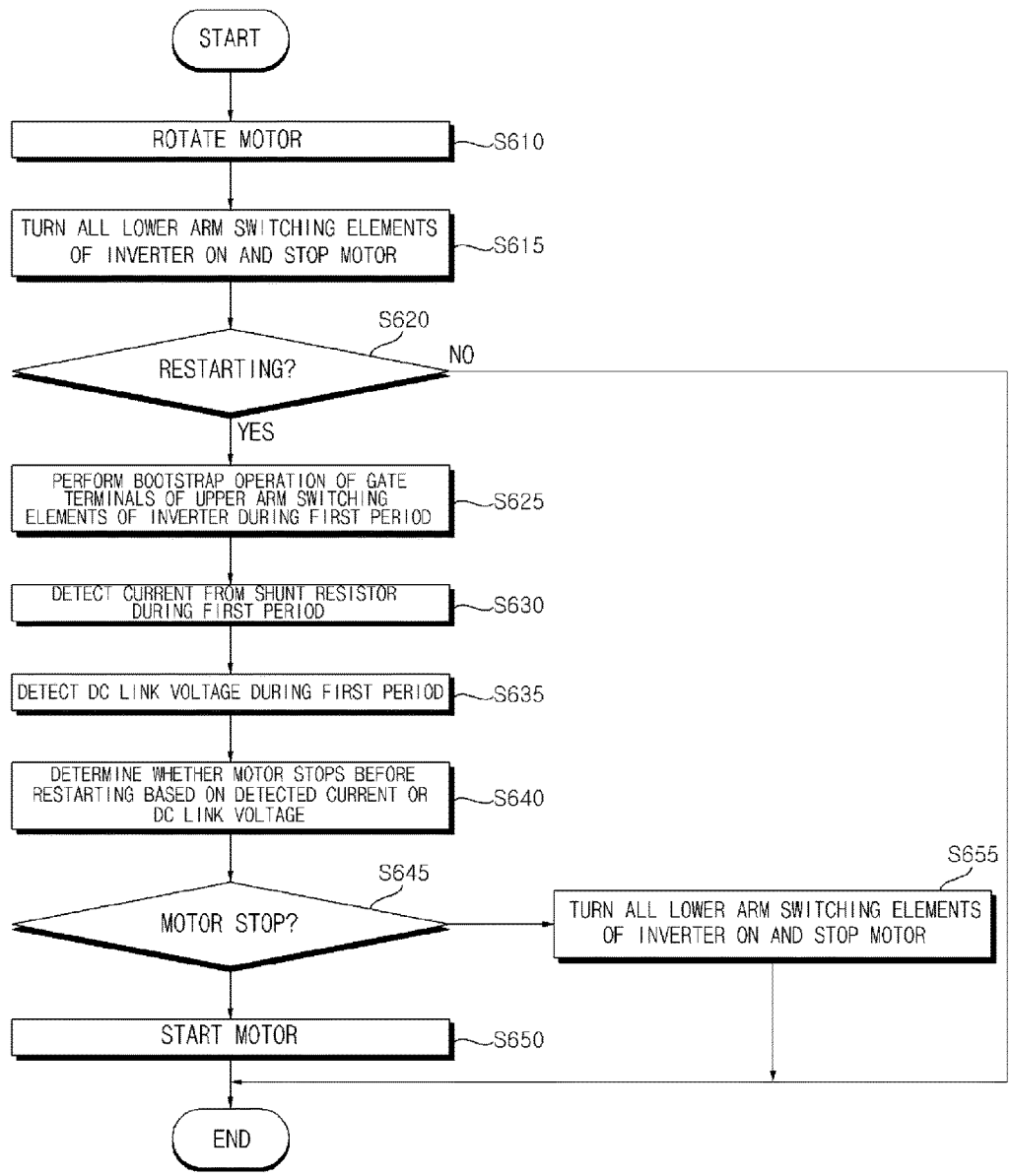
FIG. 6 is a flowchart illustrating a method of operating a motor driving apparatus according to an embodiment of the present disclosure.

First, referring to FIG. 6, the inverter controller 430 controls rotation of the motor 230 (S610). Next, the inverter controller 430 controls turn-on of the lower arm switching elements S'a, S'b and S'c, in order to stop the motor 230. Next, the inverter controller 430 controls bootstrap operation of the gate terminals of the upper arm switching elements of the inverter 420 to be performed during a first period for starting the motor 230 (S625), when motor restarting input is received (S620).

Next, the output current detector E detects output current using the shunt resistor Rs during the first period (S630). Next, the dc link voltage detector B detects the dc link voltage during the first period (S635). Next, the inverter controller 430 determines whether the motor 230 stops based on the dc link voltage detected by the dc link voltage detector B or the output current detected by the output current detector E (S640).

The inverter controller 430 controls starting of the motor 230 (S650) when the motor 230 stops (S645). When the motor 230 rotates without stopping, the inverter controller 430 controls turn-on of the lower arm switching elements S'a, S'b and S'c (S655), in order to stop the motor 230.

Figure 7A:
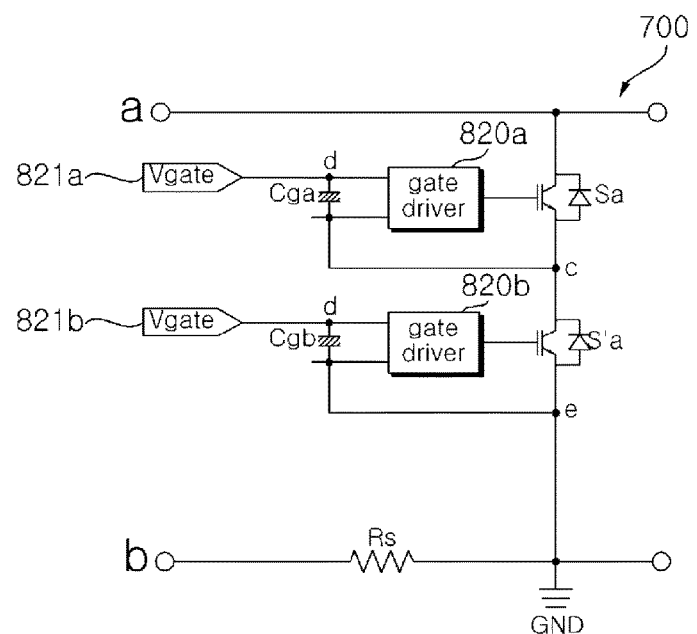
FIGS. 7A to 11B are views referenced to explain the method of FIG. 6.
Figure 7B:
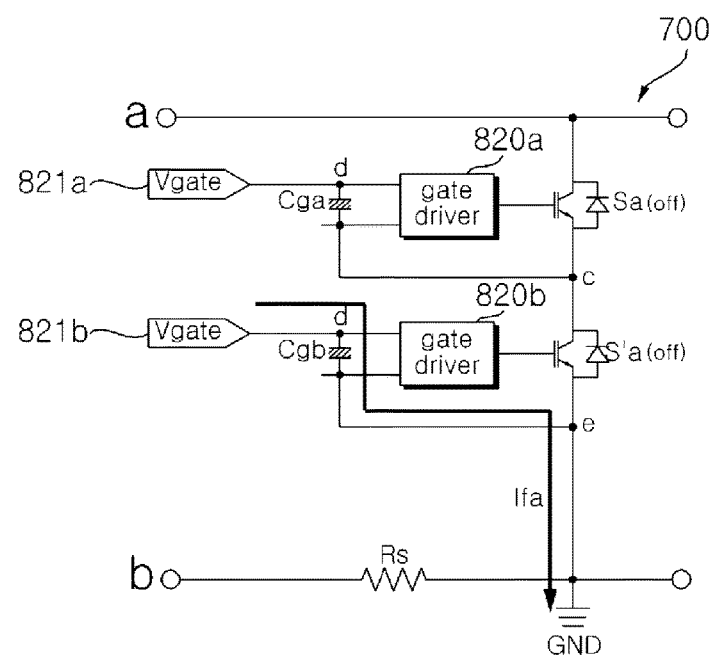
Figure 7C:
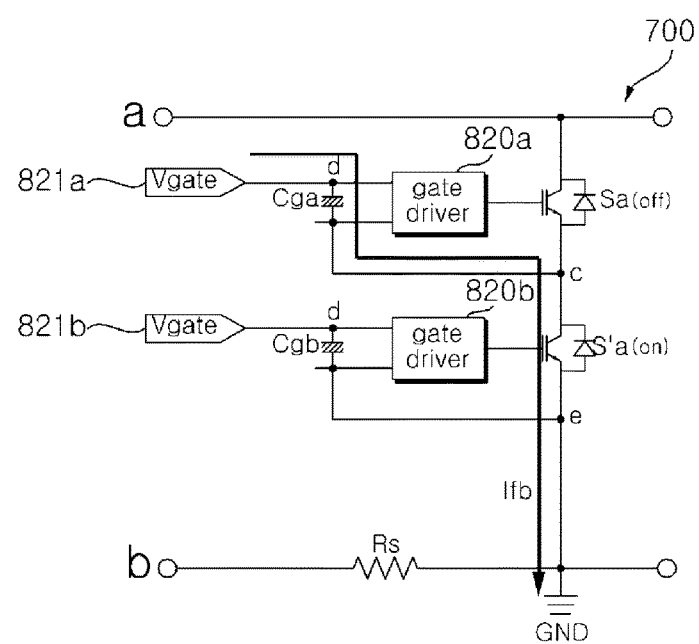

FIGS. 7A to 7C are diagrams referenced to explain operation of a pair of switching elements of the inverter of FIG. 4. FIG. 7A is a circuit diagram showing gate drivers 820a and 820b, gate capacitors Cga and Cgb, a pair of switching elements Sa and S'a and the shunt resistor Rs. A pair of switching elements Sa and S'a may be connected in series between the dc ends (between a node a and a node b). That is, the upper arm switching element Sa is connected between the node a and a node c and the lower arm switching element S'a may be connected between the node c and a node e.

The resistor Rs may be connected between the node e and the node b. The node e may be the ground GND. As described above, the resistor Rs is used to detect output current and is disposed between the dc link capacitor C and the inverter 420.

The output terminals of the gate drivers 820a and 820b may be connected to the gate terminals of a pair of switching elements Sa and S'a. Each of the gate capacitors Cga and Cgb for supplying the driving voltages of the gate drivers 820a and 820b may be connected between both ends of the input terminals of the gate drivers 820a and 820b, respectively.

The gate drive voltages 821a and 821b may be supplied to the gate capacitors Cga and Cgb, respectively. The gate drive voltages 821a and 821b may be about 15 V.

The method of charging the gate capacitors Cga and Cgb with the gate drive voltages 821a and 821b will be described with reference to FIGS. 7B and 7C. FIG. 7B shows a method of charging the gate capacitor 821b of the gate driver 820b corresponding to the lower arm switching element S'a. Referring to the figure, even when a pair of switching elements Sa and S'a is turned off, current Ifa flowing in the gate capacitor Cgb and the ground GND is formed by the gate drive voltage 821b and thus the gate capacitor Cgb is charged with the gate drive voltage 821b.

The method of charging the gate capacitor 821b of the gate driver 820b corresponding to the lower arm switching element S'a may be controlled by the inverter controller 430. That is, the inverter controller 430 may control turn-off of the upper arm switching elements Sa, Sb and Sc and lower arm switching elements S'a, S'b and S'c of the inverter 420 to charge the gate capacitor connected across the gate driver corresponding to the lower arm switching elements S'a, S'b and S'c with the gate drive voltage, in the first period, before driving the motor 230. Since the upper arm switching element Sa may float without being connected to the ground, the gate capacitor Cga is charged with the gate drive voltage 821a using the bootstrap method.

FIG. 7C shows a method of charging the gate capacitor 821a of the gate driver 820a corresponding to the upper arm switching element Sa. Referring to the figure, when the upper arm switching element Sa of a pair of switching elements Sa and S'a is turned off and the lower arm switching element S'a is turned on, current Ifb flowing in the gate capacitor Cga, the lower arm switching element S'a and the ground GND is formed by the gate drive voltage 821a to charge the gate capacitor Cga with the gate drive voltage 821b. That is, the gate capacitor Cga is charged with the gate drive voltage 821a using the bootstrap method.

The method of charging the gate capacitor 821a of the gate driver 820a corresponding to the upper arm switching element Sa may be controlled by the inverter controller 430. That is, the inverter controller 430 may control turn-on of the upper arm switching elements Sa, Sb and Sc and lower arm switching elements S'a, S'b and S'c of the inverter 420 to charge the gate capacitor connected across the gate driver corresponding to the upper arm switching elements Sa, Sb and Sc with the gate drive voltage, in the first period, before driving the motor 230. The gate capacitor of the gate driver corresponding to the lower arm switching elements of FIG. 7C may be charged after charging the gate capacitor of the gate driver corresponding to the lower arm switching elements of FIG. 7B and vice versa.

Figure 9:
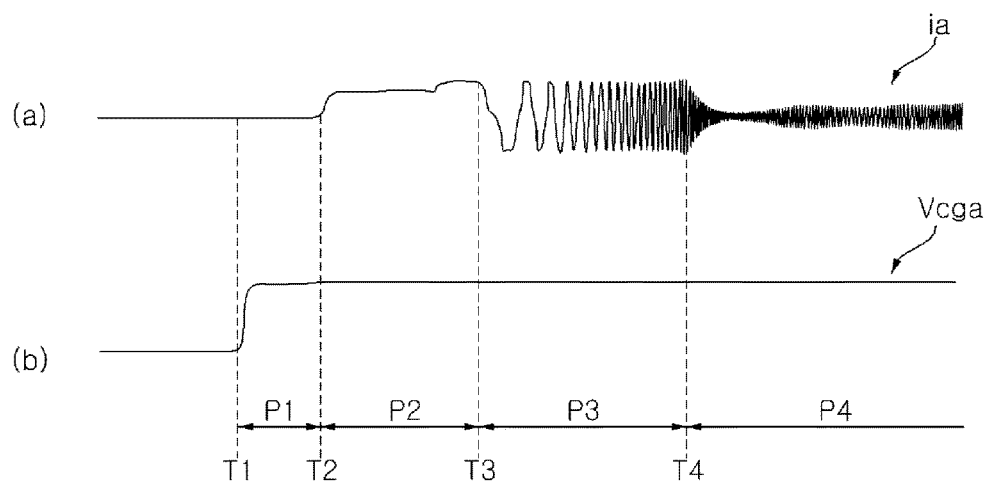

The period P1 in which the gate capacitor is charged may be before driving the motor as shown in FIG. 9. Thereafter, there are a motor alignment period P2, a motor speed increasing period P3, a normal operation period P4, etc.

In portion (b) of FIG. 9, after the period P1 in which the gate capacitor is charged, the voltage Vcga charged in the gate capacitor Cga is maintained at a predetermined level or more. When the motor 230 rotates while the gate capacitors of FIGS. 7b and 7c are charged, as shown in FIG. 8A, the current component by counter electromotive force caused by the motor 230 flows into the dc link capacitor.

Figure 8A:
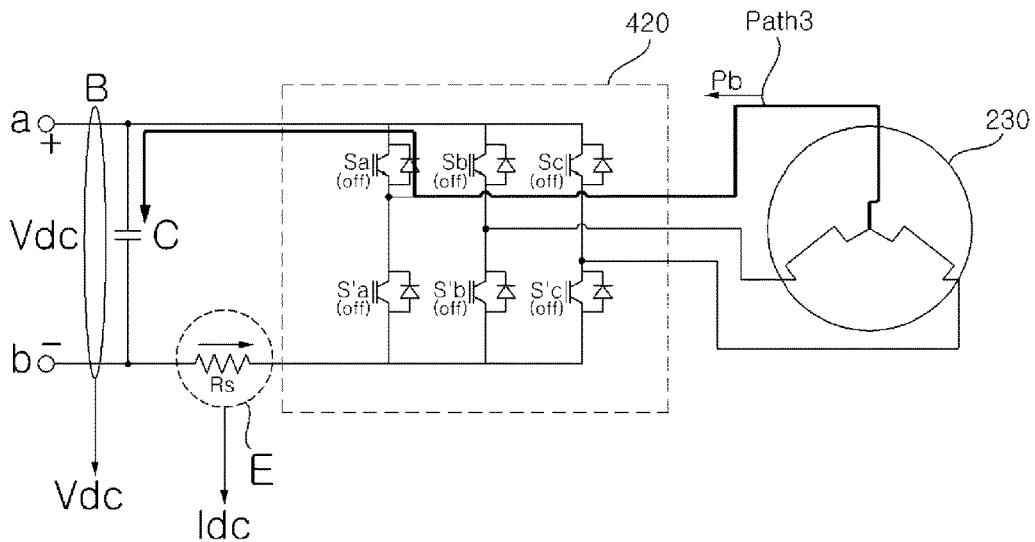

In particular, as shown in FIG. 7C, when the lower arm switching elements S'a, S'b and S'c of the inverter 420 is turned on as shown in FIG. 7C and then is turned off as shown in FIG. 7B, a current path is formed in the motor 230 as shown in FIG. 7C such that the motor 230 consumes power by rheostatic braking and then forming of the current path is stopped as shown in FIG. 7B, thereby flowing the current component by counter electromotive force caused by the motor 230 into the dc link capacitor C as shown in FIG. 8A.

Figure 10A:
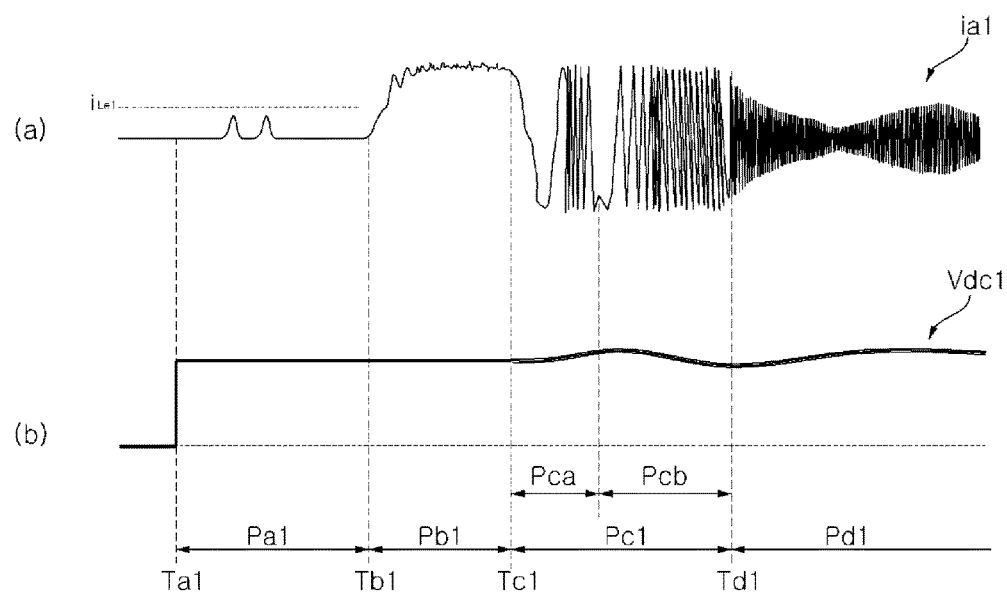
Figure 10B:
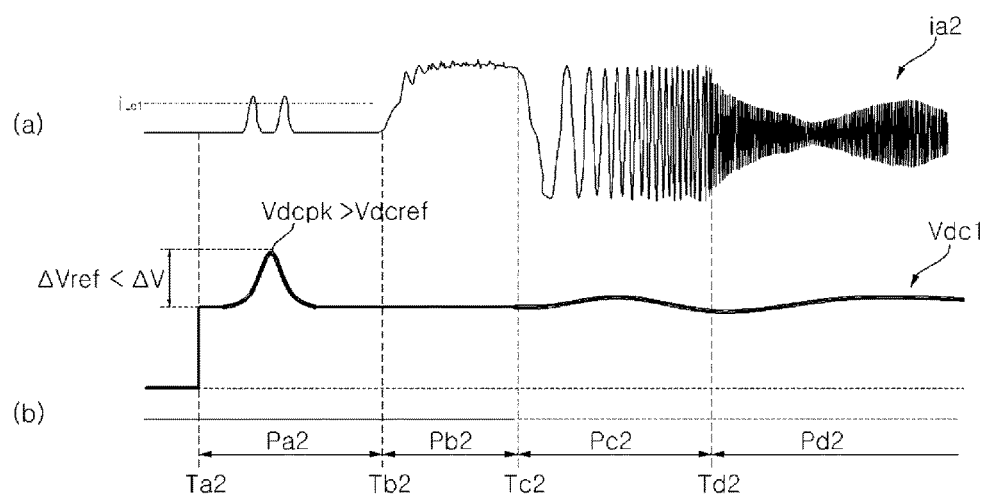

As shown in FIG. 10B, the inverter controller 430 may determine that the motor 230 rotates when the change in dc link voltage ΔV detected by the dc link voltage detector B is equal to or greater than a first predetermined value ΔVref or the peak value Vdcpk of the dc link voltage detected by the dc link voltage detector B is equal to or greater than a first level Vdcref and control rheostatic braking to be performed in order to stop the motor 230.

Figure 8B:
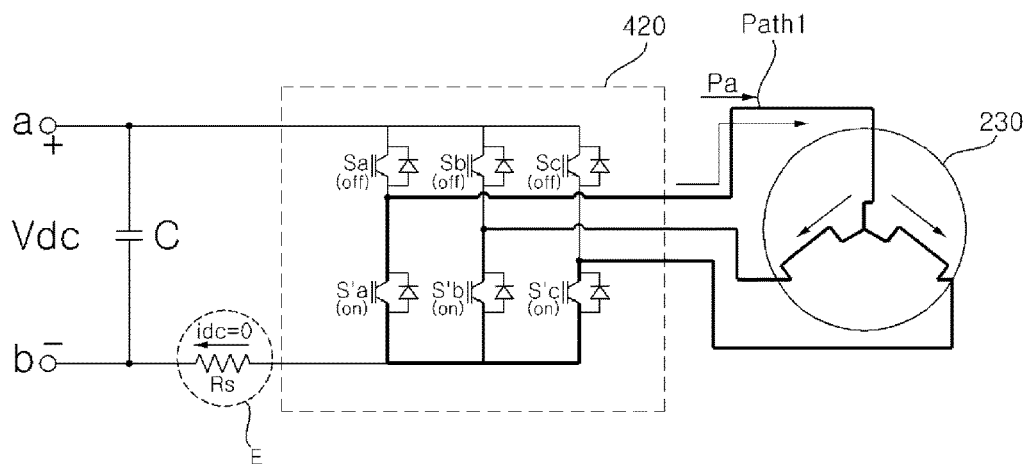

Alternatively, as shown in FIG. 10A, the inverter controller 430 may determine that the motor 230 rotates when change in output current Ai detected by the output current detector E is equal to or greater than a second predetermined value or the peak value of the output current detected by the output current detector E is equal to or greater than a second level ILe1 and control rheostatic braking to be performed in order to stop the motor 230. When the motor 230 stops while the gate capacitors of FIGS. 7B and 7C are charged, as shown in FIG. 8B, rheostatic braking is performed in the motor 230 without counter electromotive force caused by the motor 230, such that the motor 230 consumes power.

As shown in FIG. 10A, the inverter controller 430 may determine that the motor 230 stops when change in dc link voltage ΔV detected by the dc link voltage detector B is less than the first predetermined value ΔVref or the peak value Vdcpk of the dc link voltage detected by the dc link voltage detector B is less than the first level Vdcref and control alignment of the motor 230 in the alignment period Pb1 after the first period Pa1 and then control operation of the motor speed increasing period Pc and the normal operation period Pd1.

Alternatively, as shown in FIG. 10A, the inverter controller 430 may determine that the motor 230 stops when change in output current detected by the output current detector E is less than the second predetermined value or the peak value of the output current detected by the output current detector E is less than the second level ILe1 and control alignment of the motor 230 after the first period and control operation of the motor speed increasing period Pc and the normal operation period Pd1.

Figure 11A:
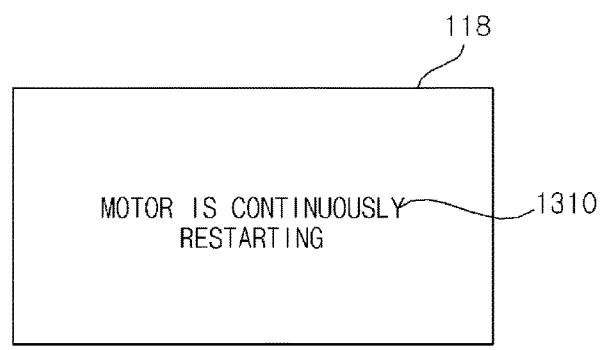
Figure 11B:
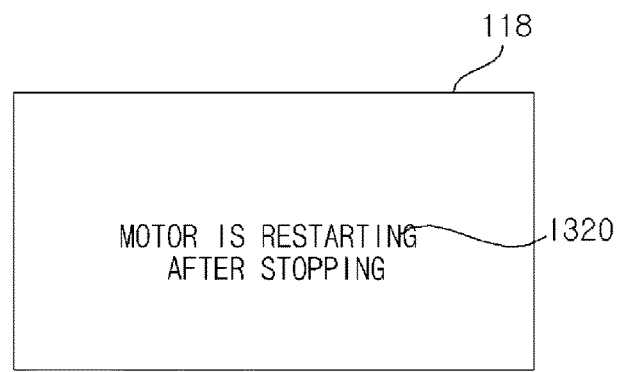

FIGS. 11a to 11b are diagrams showing a variety of information displayed on a display depending on whether the motor stops. First, upon determining that the motor 230 stops while the gate capacitors of FIGS. 7B and 7C are charged, the inverter controller 430 may control output of a message 1310 for continuously restarting the motor on the display 130 as shown in FIG. 11A.

Next, upon determining that the motor 230 rotates while the gate capacitors of FIGS. 7B and 7C are charged, the inverter controller 430 may control output of a message 1320 for restarting the motor after stopping on the display 130 as shown in FIG. 11B. By various messages, a user may conveniently recognize a mode for restarting the motor or a mode for stopping and then restarting the motor depending on whether the motor stops or not.

Figure 12:
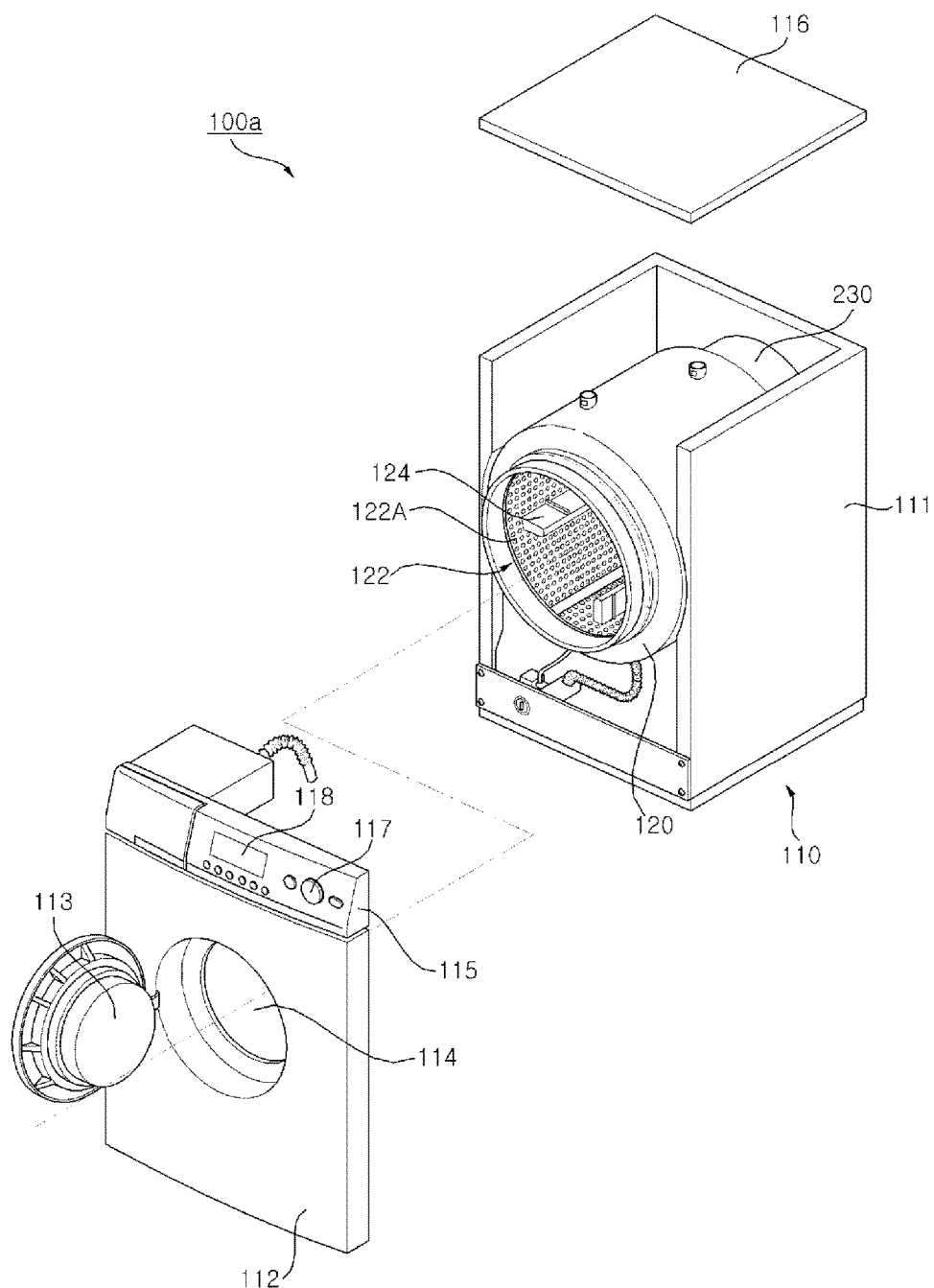
FIG. 12 is a perspective view showing a laundry treatment machine which is an example of a home appliance according to an embodiment of the present disclosure.

FIG. 12 is a perspective view showing a laundry treatment machine according to an embodiment of the present disclosure. Referring to the figure, the laundry treatment machine 100a according to the embodiment of the present disclosure is a front load type laundry treatment machine in which laundry is inserted into a drum in a front direction. The front load type laundry treatment machine includes a washing machine for washing and rinsing laundry or a dryer for drying laundry. Hereinafter, the washing machine will be focused upon.

The laundry treatment machine 100a of FIG. 12 is a drum type laundry treatment machine, which includes a cabinet 110 forming an appearance of the laundry treatment machine 100a, a tub 120 provided in the cabinet 110 and supported by the cabinet 110, a drum 122 which is provided in the tub 120 and in which laundry is washed, a motor 130 for driving the drum 122, a washing water supply device (not shown) provided outside a cabinet body 111 to supply washing water into the cabinet 110, and a drainage device (not shown) formed at the lower side of the tub 120 to drain washing water.

A plurality of openings 122A is formed in the drum 122 to pass washing water and a lifter 124 may be provided on the inner surface of the drum 122 such that laundry is lifted up to a predetermined height and then is dropped by gravity. The cabinet 110 includes the cabinet body 111, a cabinet cover 112 provided on a front surface of the cabinet body 111 to be coupled to the cabinet body, a control panel 115 provided above the cabinet cover 122 to be coupled to the cabinet body 111, and a top plate 116 provided above the control panel 115 to be coupled to the cabinet body 111.

The cabinet cover 112 includes a laundry inlet 114, through which laundry is put into and taken out of the washing machine, and a door 113 rotatably provided such that the laundry inlet 114 is opened or closed. The control panel 115 includes operation keys 117 for controlling an operation state of the laundry treatment machine 100a and a display 118 provided at one side of the operation keys 117 to display the operation state of the laundry treatment machine 100a. The operation keys 117 and the display 118 of the control panel 115 are electrically connected to a controller (not shown) and the controller (not shown) electrically controls the components of the laundry treatment machine 100a. Operation of the controller (not shown) will be described later.

The drum 122 may include an auto balance (not shown). The auto balance (not shown) reduces vibrations generated according eccentricity of laundry contained in the drum 122 and may be implemented by a liquid balance, a ball balance, etc. Although not shown in the figure, the laundry treatment machine 100a may further include a vibration sensor for measuring vibrations of the drum 122 or vibrations of the cabinet 110.

Figure 13:
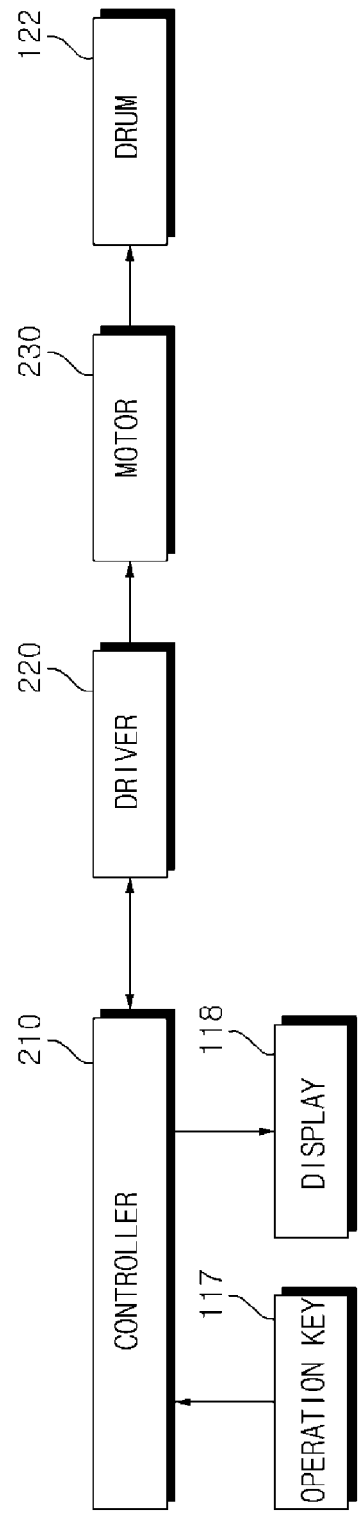
FIG. 13 is a block diagram showing the internal configuration of the laundry treatment machine of FIG. 12.

FIG. 13 is a block diagram showing the internal configuration of the laundry treatment machine of FIG. 12. Referring to the figure, in the laundry treatment machine 100a, the driver 220 is controlled by control operation of the controller 210 and the driver 220 drives the motor 230. Therefore, the drum 122 rotates by the motor 230.

The controller 210 may operate according an operation signal from the operation keys 117 so as to perform washing, rinsing and dehydration cycles. In addition, the controller 210 controls the display 118 so as to display a washing course, a washing time, a dehydration time, a rinsing time, a current operation state, etc.

The controller 210 controls the driver 220 to operate the motor 230. At this time, a position sensor for sensing the position of the rotor of the motor is not provided inside or outside the motor 230. That is, the driver 220 controls the motor 230 in a sensorless manner.

The driver 220 may drive the motor 230 and may include an inverter (not shown), an inverter controller (not shown), an output current detector (E of FIG. 2) for detecting output current flowing in the motor 230 and an output voltage detector (F of FIG. 2) for detecting the output voltage vo applied to the motor 230. In addition, the driver 220 may further include a converter for supplying a DC voltage to the inverter (not shown).

For example, the inverter controller (430 of FIG. 2) of the driver 220 estimates the position of the rotor of the motor 230 based on the output current idc and the output voltage vo. The inverter controller controls rotation of the motor 230 based on the estimated position of the rotor. More specifically, when the inverter controller (430 of FIG. 2) generates and outputs a pulse width modulation (PWM) switching control signal (Sic of FIG. 2) to the inverter (not shown) based on the output current idc and the output voltage vo, the inverter (not shown) may perform a high-speed switching operation to supply an AC voltage having a predetermined frequency to the motor 230. The motor 230 rotates by the AC voltage having the predetermined frequency. The driver 220 may correspond to the motor driver 220 of FIG. 1.

The controller 210 may sense the amount of laundry based on the output current idc flowing in the motor 230. For example, while the drum 122 rotates, the amount of laundry may be sensed based on the current value idc of the motor 230. In particular, the controller 210 may accurately sense the amount of laundry using resistance and inductance values of the stator of the motor measured in the motor alignment period, upon sensing the amount of laundry.

The controller 210 may sense eccentricity of the drum 122, that is, unbalance UB of the drum 122. Eccentricity may be sensed based on a ripple component of the output current idc flowing in the motor 230 or change in rotation speed of the drum 122. In particular, the controller 210 may accurately sense eccentricity using resistance and inductance values of the stator of the motor measured in the motor alignment period, upon sensing the amount of laundry.

Figure 14:
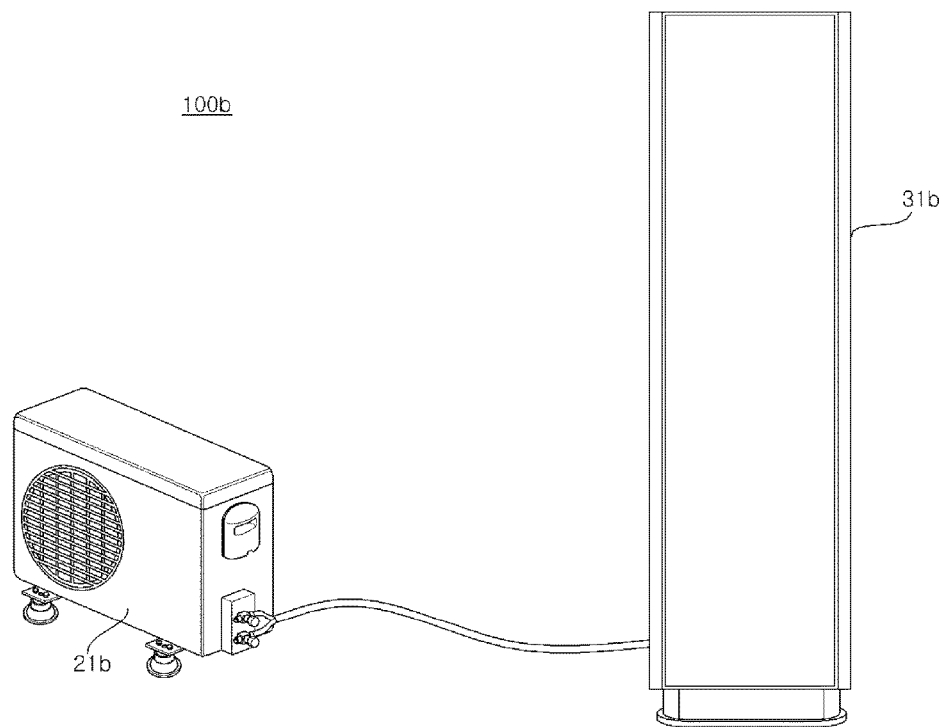
FIG. 14 is a diagram showing the configuration of an air conditioner which is another example of a home appliance according to an embodiment of the present disclosure.

FIG. 14 is a diagram showing the configuration of an air conditioner which is another example of a home appliance according to an embodiment of the present disclosure. As illustrated in FIG. 14, an air conditioner 100b according to an embodiment of the present disclosure may include an indoor unit 31b and an outdoor unit 21b connected to the indoor unit 31b.

The indoor unit 31b of the air conditioner may be any one of stand type, wall mount type, and ceiling type air conditioners. In the figure, the stand type indoor unit 31b is illustrated. The air conditioner 100b may further include at least one of a ventilator, an air purifier, a humidifier, and a heater, which may be operatively connected to the indoor unit and the outdoor unit.

The outdoor unit 21b includes a compressor (not shown) for compressing a refrigerant, an outdoor heat exchanger (not shown) for performing heat exchange between the refrigerant and outdoor air, an accumulator (not shown) for extracting a gaseous refrigerant component from the refrigerant and supplying the extracted gaseous refrigerant component to the compressor, and a four-way valve (not shown) for changing a flow path of the refrigerant based on a heating operation. In addition, while the outdoor unit 21b may further include a plurality of sensors, a valve, and an oil collector, descriptions thereof will be omitted herein.

The outdoor unit 21b operates compressors and outdoor heat exchangers included therein to compress the refrigerant or perform heat exchange based on setting conditions and to supply the compressed or heat-exchanged refrigerant to the indoor unit 31b. The outdoor unit 21b may be driven according to demand of a remote control unit (not shown) or the indoor unit 31b. As a cooling/heating capacity of the air conditioner 100b varies based on the indoor unit which is driven, the number of driven outdoor units and the number of driven compressors installed in outdoor units may be changed.

In this case, the outdoor unit 21b supplies the compressed refrigerant to the connected indoor unit 31b. The indoor unit 31b receives the refrigerant from the outdoor unit 21b to discharge cool or hot air into a room. The indoor unit 31b includes an indoor heat exchanger (not shown), an indoor fan (not shown), an expansion valve (not shown) for expanding the refrigerant, and a plurality of sensors (not shown).

The outdoor unit 21b and the indoor unit 31b are connected to each other via communication cables to exchange data with each other. The outdoor unit and the indoor unit are connected to the remote control unit (not shown) by wire or wirelessly to operate under control of the remote control unit (not shown).

A remote controller (not shown) is connected to the indoor unit 31b to allow a user to input a control command for controlling the indoor unit and to receive and display state information on the indoor unit. In this case, the remote controller may communicate with the indoor unit in a wired or wireless manner according to how the remote controller is connected to the indoor unit 31b.

Figure 15:
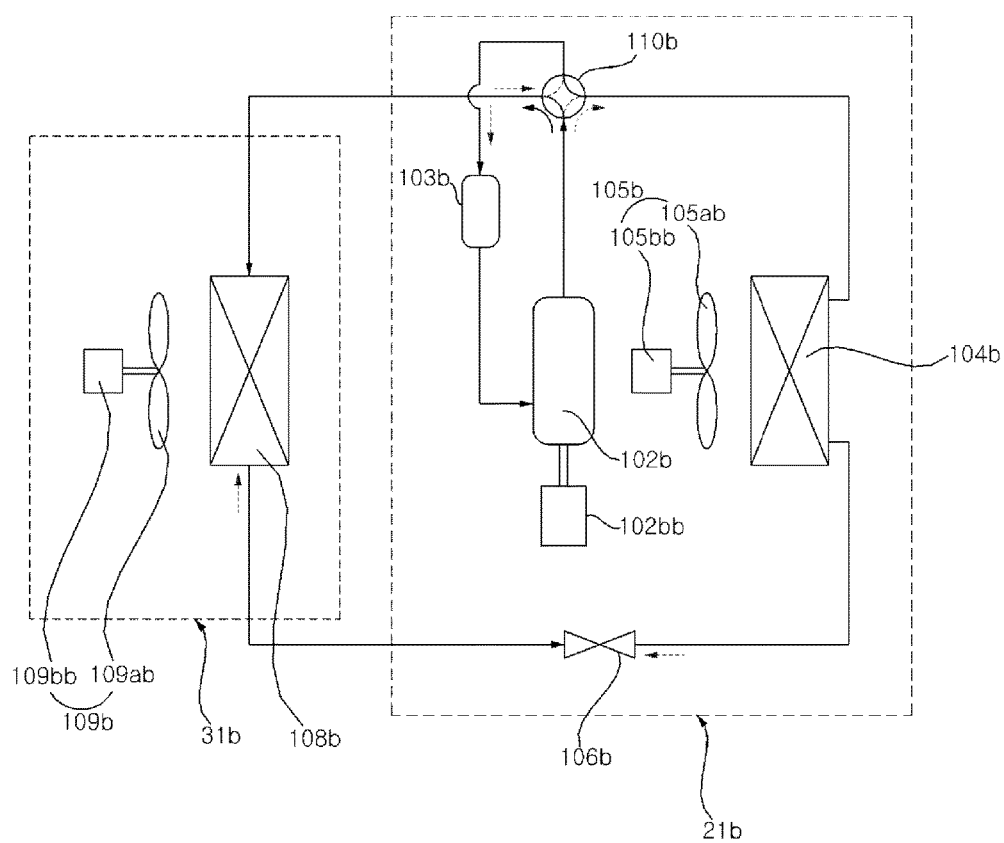
FIG. 15 is a schematic diagram showing an outdoor unit and an indoor unit of FIG. 14.

FIG. 15 is a schematic view of the outdoor unit and the indoor unit shown in FIG. 14. Referring to FIG. 15, the air conditioner 100b is broadly divided into the indoor unit 31b and the outdoor unit 21b.

The outdoor unit 21b includes a compressor 102b for compressing a refrigerant, a compressor motor 102bb for driving the compressor, an outdoor heat exchanger 104b for dissipating heat from the compressed refrigerant, an outdoor blower 105 including an outdoor fan 105ab disposed at one side of the outdoor heat exchanger 104b to accelerate heat dissipation of the refrigerant and an outdoor fan motor 105bb for rotating the outdoor fan 105ab, an expansion unit 106 for expanding the condensed refrigerant, a cooling/heating switching valve 110b for changing a flow path of the compressed refrigerant, and an accumulator 103b for temporarily storing the gaseous refrigerant to remove moisture and foreign particles from the refrigerant and supplying the refrigerant of predetermined pressure to the compressor.

The indoor unit 31b includes an indoor heat exchanger 109b disposed in a room to perform a cooling/heating function, and an indoor blower 109b including an indoor fan 109ab disposed at one side of the indoor heat exchanger 109b to accelerate heat dissipation of the refrigerant and an indoor fan motor 109bb for rotating the indoor fan 109ab.

At least one indoor heat exchanger 109b may be provided. At least one of an inverter compressor and a constant speed compressor may be used as the compressor 102b. In addition, the air conditioner 100b may be configured as a cooler for cooling the room or may be configured as a heat pump for cooling or heating the room.

The compressor 102b of the outdoor unit 21b of FIG. 14 may be driven by the motor driving apparatus for driving the compressor motor 250b shown in FIG. 1. Alternatively, the indoor fan 109ab or the outdoor fan 105ab may be driven by the motor driving apparatus for driving the indoor fan motor 109bb and the outdoor fan motor 150bb shown in FIG. 1.

Figure 16:
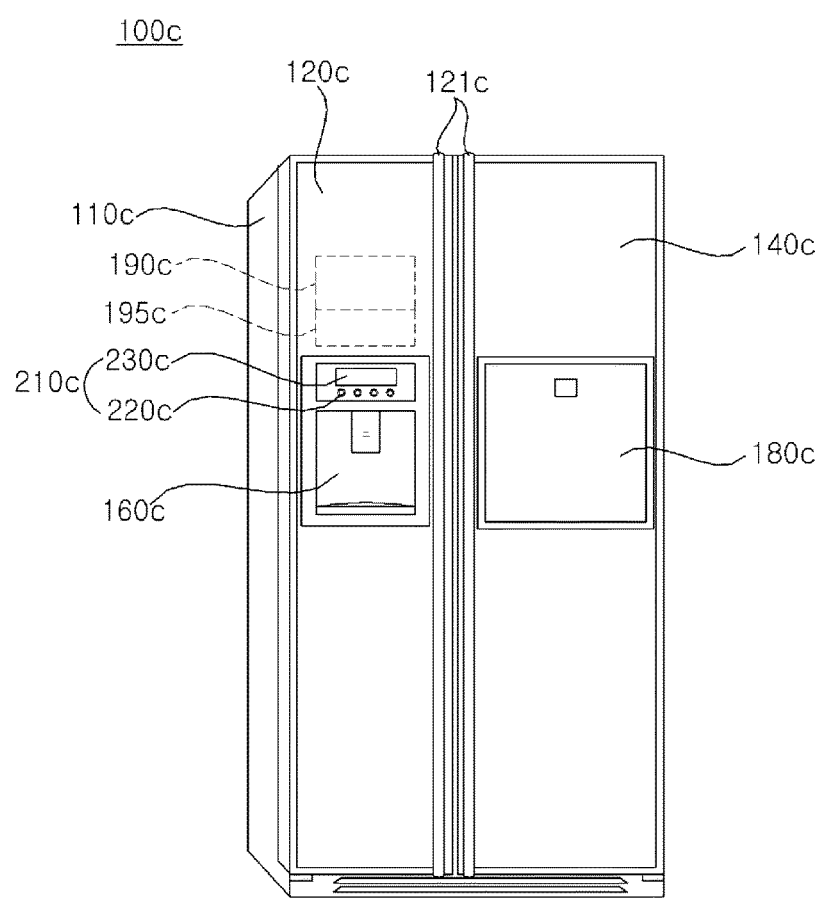
FIG. 16 is a perspective view showing a refrigerator which is another example of a home appliance according to an embodiment of the present disclosure.

FIG. 16 is a perspective view showing a refrigerator which is another example of a home appliance according to an embodiment of the present disclosure. With reference to the drawing, the refrigerator 100c related to the present disclosure includes a case 110c, which has an inner space divided into a freezing compartment and a refrigerating compartment (not shown in the drawing), a freezing compartment door 120c to shield the freezing compartment, and a refrigerating compartment door 140c to shield the refrigerating compartment, the case 110c and the doors 120c and 140c defining an outer appearance of the refrigerator.

The freezing compartment door 120c and the refrigerating compartment door 140c may be provided at front surfaces thereof with forwardly protruding door handles 121c to assist a user in easily pivoting the freezing compartment door 120c and the refrigerating compartment door 140c by gripping the door handles 121c. The refrigerating compartment door 140c may further be provided at a front surface thereof with a so-called home bar 180c that allows the user to conveniently retrieve stored items, such as beverages, without opening the refrigerating compartment door 140c.

The freezing compartment door 120c may further be provided at a front surface thereof with a dispenser 160c that allows the user to easily and conveniently retrieve ice or drinking water without opening the freezing compartment door 120c. The freezing compartment door 120c may further be provided with a control panel 210c at the upper side of the dispenser 160c. The control panel 210c serves to control driving operation of the refrigerator 100c and to display a screen showing a current operating state of the refrigerator 100c.

While the dispenser 160c is shown in the drawing as being located at the front surface of the freezing compartment door 120c, the present disclosure is not limited thereto and the dispenser 160c may be located at the front surface of the refrigerating compartment door 140c. In addition, the freezing compartment (not shown) may accommodate, in an upper region thereof, an icemaker 190c used to make ice using water supplied thereto and cold air within the freezing compartment and an ice bank 195c located under the icemaker 190c to receive ice released from the icemaker 190c. In addition, although not shown in the drawing, an ice chute (not shown) may be used to guide the ice received in the ice bank 195c to fall into the dispenser 160c.

The control panel 210c may include an input unit 220c having a plurality of buttons and a display unit 230c to display control screens, operating states, and the like. The display unit 230c displays control screens, operating states, and other information, such as an internal temperature of the refrigerator, etc. For example, the display unit 230c may display a service type of the dispenser (ice cubes, water, crushed ice), a set temperature of the freezing compartment, and a set temperature of the refrigerating compartment. The display unit 230c may be any one of a liquid crystal display (LCD), a light emitting diode (LED), and an organic light emitting diode (OLED) units and the like. In addition, the display unit 230c may be a touchscreen that may additionally perform a function of the input unit 220c.

The input unit 220c may include a plurality of operation buttons. For example, the input unit 220c may include a dispenser setting button (not shown) to set a service type of the dispenser (ice cubes, water, crushed ice), a freezing compartment temperature setting button (not shown) to set a temperature of the freezing compartment, and a refrigerating compartment temperature setting button (not shown) to set a temperature of the refrigerating compartment. In addition, the input unit 220c may be a touchscreen that may additionally perform a function of the display unit 230c.

The refrigerator according to embodiments of the present disclosure is not limited to a double door type shown in the drawing, and may be any one of a one door type refrigerator, a sliding door type refrigerator, a curtain door type refrigerator and others.

Figure 17:
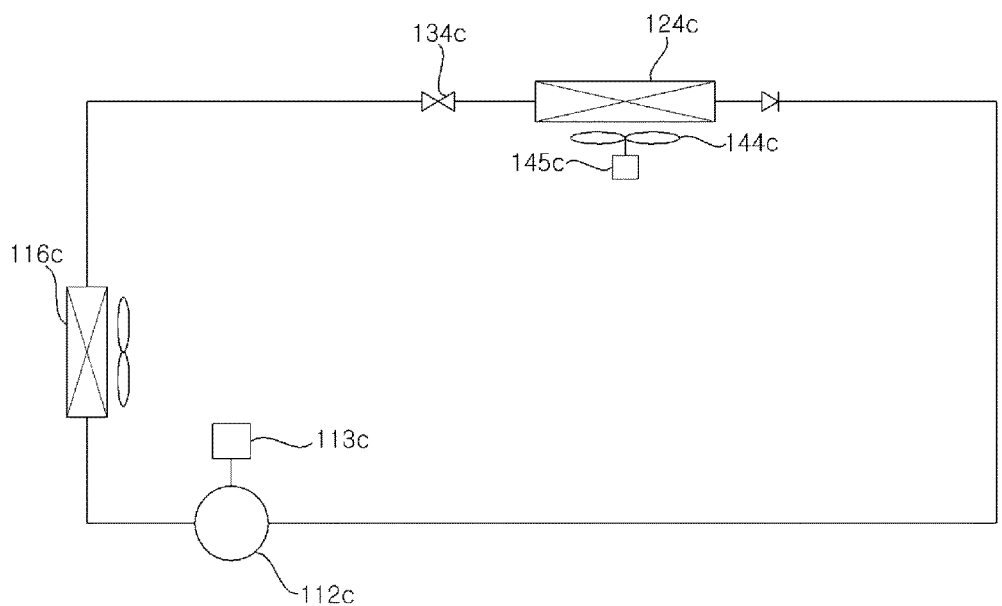
FIG. 17 is a diagram showing the configuration of a refrigerator of FIG. 16.

FIG. 17 is a diagram showing the configuration of the refrigerator of FIG. 16. In explaining with reference to the drawing, the refrigerator 100c may include a compressor 112c, a condenser 116c to condense refrigerant compressed in the compressor 112c, a freezing compartment evaporator 124c placed in the freezing compartment (not shown) to evaporate the condensed refrigerant directed from the condenser 116c, and a freezing compartment expansion valve 134c to expand the refrigerant to be directed to the freezing compartment evaporator 124c.

While the drawing shows use of a single evaporator by way of example, evaporators may be respectively placed in the freezing compartment and the refrigerating compartment. That is, the refrigerator 100c may further include a refrigerating compartment evaporator (not shown) placed in the refrigerating compartment (not shown), a 3-way valve (not shown) to direct the condensed refrigerant from the condenser 116c to the refrigerating compartment evaporator (not shown) or the freezing compartment evaporator 124c, and a refrigerating compartment expansion valve (not shown) to expand the refrigerant to be directed to the refrigerating compartment evaporator (not shown).

In addition, the refrigerator 100c may further include a gas-liquid separator (not shown) in which the refrigerant having passed through the freezing compartment evaporator 124c is divided into liquid and gas. The refrigerator 100c may further include a refrigerating compartment fan (not shown) and a freezing compartment fan 144c, which suction cold air having passed through the freezing compartment evaporator 124c and blow the cold air to the refrigerating compartment (not shown) and the freezing compartment (not shown) respectively.

The refrigerator 100c may further include a compressor drive unit 113c to drive the compressor 112c, a refrigerating compartment fan drive unit (not shown) to drive the refrigerating compartment fan (not shown), and a freezing compartment fan drive unit 145c to drive the freezing compartment fan 144c. Meanwhile, in the case in which the common evaporator 124c is used in the freezing compartment and the refrigerating compartment as shown in the drawing, a damper (not shown) may be installed between the freezing compartment and the refrigerating compartment, and a fan (not shown) may forcibly blow cold air generated by the single evaporator to the freezing compartment and the refrigerating compartment. The compressor 112c of FIG. 17 may be driven by the motor driving apparatus for driving the compressor motor shown in FIG. 1.

The refrigerating compartment fan (not shown) and the freezing compartment fan 144c may be driven by the motor driving apparatus for driving the freezing compartment fan motor (not shown) and the freezing compartment fan motor (not shown) shown in FIG. 1.

According to an embodiment of the present disclosure, the motor driving apparatus and the home appliance including the same include a dc link capacitor configured to store a direct current (DC) voltage, an inverter including a plurality of upper and lower arm switching elements and configured to convert the voltage stored in the dc link capacitor into an alternating current (AC) voltage by switching operation and to output the converted AC voltage to a motor, a dc link voltage detector configured to detect the voltage of the dc link capacitor, an output current detector provided between the dc link capacitor and the inverter and configured to detect output current flowing in the motor, and a controller configured to control the inverter based on the output current. The controller controls rheostatic braking to be performed in order to stop the motor, performs bootstrap operation of gate terminals of the upper arm switching elements of the inverter during a first period for starting the motor, and determines whether the motor stops during the first period based on the dc link voltage detected by the dc link voltage detector or the output current detected by the output current detector. Accordingly, it is possible to conveniently determine whether the motor stops in the sensorless type motor driving apparatus. In particular, since a determination as to whether the motor stops is made during the first period in which the bootstrap operation is performed, a time for determining whether the motor stops is not separately required.

A motor driving apparatus and a home appliance including the same according to another embodiment of the present disclosure includes a dc link capacitor configured to store a direct current (DC) voltage, an inverter including a plurality of upper and lower arm switching elements and configured to convert the voltage stored in the dc link capacitor into an alternating current (AC) voltage by switching operation and to output the converted AC voltage to a motor, a dc link voltage detector configured to detect the voltage of the dc link capacitor, an output current detector provided between the dc link capacitor and the inverter and configured to detect output current flowing in the motor, and a controller configured to control the inverter based on the output current. The controller determines that the motor rotates when change in the dc link voltage detected by the dc link voltage detector is equal to or greater than a first predetermined value or a peak value of the dc link voltage detected by the dc link voltage detector is equal to or greater than a first level, upon restarting the motor after stopping, and controls stopping of the motor. Accordingly, it is possible to conveniently determine whether the motor stops in the sensorless type motor driving apparatus.

The motor driving apparatus and the home appliance including the same according to the embodiment of the present disclosure should not be limited to configurations and methods of the above-described embodiments, and all or some of the embodiments may be selectively combined with one another to achieve various alterations.

The method of driving the motor or the method of operating the home appliance according to the present disclosure may be implemented as code that can be written to a processor-readable recording medium and can thus be read by a processor provided in the motor driving apparatus or the home appliance. The processor-readable recording medium may be any type of recording device in which data can be stored in a processor-readable manner. Therefore, the present disclosure provides a sensorless type motor driving apparatus capable of conveniently determining whether a motor stops and a home appliance including the same.

A motor driving apparatus may include a dc link capacitor configured to store a direct current (DC) voltage, an inverter including a plurality of upper and lower arm switching elements and configured to convert the voltage stored in the dc link capacitor into an alternating current (AC) voltage by switching operation and to output the converted AC voltage to a motor, a dc link voltage detector configured to detect the voltage of the dc link capacitor, an output current detector provided between the dc link capacitor and the inverter and configured to detect output current flowing in the motor, and a controller configured to control the inverter based on the output current, wherein the controller controls rheostatic braking to be performed in order to stop the motor, performs bootstrap operation of gate terminals of the upper arm switching elements of the inverter during a first period for starting the motor, and determines whether the motor stops during the first period based on the dc link voltage detected by the dc link voltage detector or the output current detected by the output current detector.

A motor driving apparatus may include a dc link capacitor configured to store a direct current (DC) voltage, an inverter including a plurality of upper and lower arm switching elements and configured to convert the voltage stored in the dc link capacitor into an alternating current (AC) voltage by switching operation and to output the converted AC voltage to a motor, a dc link voltage detector configured to detect the voltage of the dc link capacitor, an output current detector provided between the dc link capacitor and the inverter and configured to detect output current flowing in the motor, and a controller configured to control the inverter based on the output current, wherein the controller determines that the motor rotates when change in the dc link voltage detected by the dc link voltage detector is equal to or greater than a first predetermined value or a peak value of the dc link voltage detected by the dc link voltage detector is equal to or greater than a first level, upon restarting the motor after stopping, and controls stopping of the motor.

A home appliance may include a motor, a display, a dc link capacitor configured to store a direct current (DC) voltage, an inverter including a plurality of upper and lower arm switching elements and configured to convert the voltage stored in the dc link capacitor into an alternating current (AC) voltage by switching operation and to output the converted AC voltage to the motor, a dc link voltage detector configured to detect the voltage of the dc link capacitor, an output current detector provided between the dc link capacitor and the inverter and configured to detect output current flowing in the motor, and a controller configured to control the inverter based on the output current, wherein the controller controls rheostatic braking to be performed in order to stop the motor, performs bootstrap operation of gate terminals of the upper arm switching elements of the inverter during a first period for starting the motor, and determines whether the motor stops during the first period based on the dc link voltage detected by the dc link voltage detector or the output current detected by the output current detector. Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A motor driving apparatus comprising:
   a capacitor configured to store a charge;
   an inverter including a plurality of first switching elements and a plurality of second switching elements and configured to convert the charge stored in the capacitor into alternating current (AC) voltage and to output the AC voltage to a motor;
   a voltage detector configured to detect a voltage associated with the capacitor;
   a current detector provided between the capacitor and the inverter and configured to detect a current flowing between the capacitor to the inverter; and
   a controller configured to control the inverter based on the voltage detected by the voltage detector and the current detected by the current detector, wherein the controller controls the inverter to perform braking of the motor, performs a bootstrap operation of the plurality of first switching elements of the inverter after performing the braking and during a first period for starting the motor, determines whether the motor stops during the first period based on at least one of the voltage detected by the voltage detector or the current detected by the current detector, and further controls the inverter based on determining whether the motor stops during the first period.

2. The motor driving apparatus according to claim 1, wherein the controller determines that the motor has not stopped during the first period when at least one of a change in the voltage detected by the voltage detector is equal to or greater than a first predetermined value or a peak value of the voltage detected by the voltage detector is equal to or greater than a first level, and the controller further controls the inverter to perform addition braking based on determining that the motor has not stopped during the first period.

3. The motor driving apparatus according to claim 1, wherein the controller determines that the motor stops during the first period when at least one of a change in the voltage detected by the voltage detector is less than a first predetermined value or a peak value of the voltage detected by the voltage detector is less than a first level, and the controller further controls the inverter to perform an alignment of the motor after the first period based on determining that the motor stops during the first period.

4. The motor driving apparatus according to claim 1, wherein the controller determines that the motor has not stopped during the first period when a change in the current detected by the current detector is equal to or greater than a second predetermined value or a peak value of the current detected by the current detector is equal to or greater than a second level, and the controller further controls the inverter to perform additional braking based on determining that the motor has not stopped during the first period.

5. The motor driving apparatus according to claim 1, wherein the controller determines that the motor stops during the first period when at least one of a change in the current detected by the current detector is less than a second predetermined value or a peak value of the current detected by the current detector is less than a second level, and the controller further controls the inverter to perform an alignment of the motor after the first period based on determining that the motor stops during the first period.

6. The motor driving apparatus according to claim 1, further comprising:
   a first gate driver connected to the plurality of first switching elements;
   a second gate driver connected to the plurality of second switching elements; and
   a first gate capacitor connected to the first gate driver and a second gate capacitor connected to the second gate driver, the first gate capacitor and the second gate capacitor being configured to store a gate drive charge,
   wherein the controller:
   turns off the plurality of first switching elements and the plurality of second switching elements to cause the second gate capacitor to store the gate drive charge, or
   turns off the plurality of first switching elements and turns on the plurality of second switching elements to cause the first gate capacitor to store the gate drive charge.

7. The motor driving apparatus according to claim 1, wherein the controller determines whether the motor stops during the first period based on the voltage detected by the voltage detector or the current detected by the current detector, while the plurality of first switching elements of the inverter are turned off and the plurality of second switching elements are turned on.

8. A motor driving apparatus comprising:
   a capacitor configured to store a charge;
   an inverter including a plurality of first switching elements and a plurality of second switching elements and configured to convert the charge stored in the capacitor into an alternating current (AC) voltage and to output the converted AC voltage to a motor;
   a voltage detector configured to detect a voltage associated with the capacitor;
   a current detector provided between the capacitor and the inverter and configured to detect a current flowing toward the motor; and
   a controller configured to control the inverter based on the voltage and the current, wherein the controller determines whether the motor is moving while restarting the motor when at least one of:

a change in the voltage detected by the voltage detector is equal to or greater than a first predetermined value, a peak value of the voltage detected by the voltage detector is equal to or greater than a first level, a change in the current detected by the current detector is equal to or greater than a second predetermined value, or a peak value of the current detected by the current detector is equal to or greater than a second level, and wherein the controllers further controls the inverter to stop the motor based on determining whether the motor is moving.

9. A home appliance comprising:
a motor;
a display;
a capacitor configured to store a charge;
an inverter including a plurality of first switching elements and a plurality second switching elements and configured to convert the charge stored in the capacitor into an alternating current (AC) voltage and to output the AC voltage to the motor;
a voltage detector configured to detect a voltage associated with the DC link capacitor;
a current detector provided between the capacitor and the inverter and configured to detect a current flowing between the capacitor and the inverter; and
a controller configured to control the inverter based on the current and the voltage, wherein the controller controls the inverter to apply braking to the motor, determines whether the motor stops during a first period after applying the braking based on the voltage detected by the voltage detector or the current detected by the current detector, and controls the inverter to restart the motor during the first time period based on determining whether the motor stops.

10. The home appliance according to claim 9, wherein the controller determines that the motor is not stopped when at least one of a change in the voltage detected by the voltage detector is equal to or greater than a first predetermined value or a peak value of the voltage detected by the voltage detector is equal to or greater than a first level, and wherein the controller applies additional braking in order to stop the motor based on determining that the motor is not stopped.

11. The home appliance according to claim 10, wherein the controller determines that the motor stops when change in the voltage detected by the voltage detector is less than the first predetermined value or the peak value of the voltage detected by the voltage detector is less than the first level, and wherein the controller controls the inverter to perform an alignment of the motor based on determining that the motor stops during the first period.

12. The home appliance according to claim 10, wherein the controller causes the display to present a message indicating that the motor is being restarted based on determining that the motor did not stop.

13. The home appliance according to claim 10, wherein the controller controls the display to present a message indicating the motor is being restarted based on determining that the motor stops.

14. The home appliance according to claim 9, wherein the controller determines that the motor is not stopped when at least one of a change in the current detected by the current detector is equal to or greater than a second predetermined value or a peak value of the current detected by the current detector is equal to or greater than a second level, and wherein the controller controls the inverter to apply additional braking based on determining that the motor is not stopped.

15. The home appliance according to claim 14, wherein the controller determines that the motor stops when at least one of the change in the current detected by the current detector is less than the second predetermined value or the peak value of the current detected by the current detector is less than the second level, and wherein the controller controls the inverter to perform an alignment of the motor after the first period based on determine that the motor stops during the first period.

16. The home appliance according to claim 9, further comprising:
gate drivers connected to the plurality of first switching elements and the plurality of second switching elements of the inverter; and
gate capacitors connected to the gate drivers and configured to store a gate drive charge,
wherein the controller selectively:
turns off the plurality of first switching elements and the plurality of second switching elements of the inverter off to cause ones of the gate capacitors associated with the plurality of second switching elements to store the gate drive charge, or
turns off the plurality of first switching elements of the inverter and turns on the plurality of second switching elements to cause other ones of the gate capacitors, associated with the plurality of first switching elements, to store the gate drive charge.

17. The home appliance according to claim 16, wherein the controller determines whether the motor stops based on one or more of the voltage detected by the voltage detector or the current detected by the current detector while the plurality of first switching elements are turned off and the plurality of second switching elements are turned on.

18. The home appliance according to claim 9, wherein inverter performs a switching operation to provide three-phase AC voltage to the motor, and wherein the plurality of first switching elements and the plurality of second switching elements associated with, respectively, switching between components of the three-phase AC voltage.

19. The home appliance according to claim 9, wherein the controller estimates a speed and a position of the motor based on at least one of the detected voltage or the detected current; and the controller generates a control signal to control the inverter based on the estimated speed and the estimated position of the motor.

20. The home appliance according to claim 9, wherein the current detector includes a shunt resistor.

* * * * *